US011290991B2

United States Patent
Choi et al.

(10) Patent No.: US 11,290,991 B2
(45) Date of Patent: Mar. 29, 2022

(54) METHOD AND APPARATUS FOR DETERMINING OF TRANSMISSION RESOURCES FOR UPLINK CHANNELS OF USE FOR DUAL CONNECTIVITY IN WIRELESS COMMUNICATION SYSTEM

(71) Applicant: Samsung Electronics Co., Ltd., Suwon-si (KR)

(72) Inventors: Seunghoon Choi, Suwon-si (KR); Jinkyu Kang, Suwon-si (KR); Youngbum Kim, Suwon-si (KR); Taehyoung Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 134 days.

(21) Appl. No.: 16/861,999

(22) Filed: Apr. 29, 2020

(65) Prior Publication Data

US 2020/0351865 A1 Nov. 5, 2020

(30) Foreign Application Priority Data

May 2, 2019 (KR) .................. 10-2019-0051359
Sep. 11, 2019 (KR) .................. 10-2019-0112871

(51) Int. Cl.
*H04W 72/04* (2009.01)
*H04L 1/18* (2006.01)
(Continued)

(52) U.S. Cl.
CPC ....... *H04W 72/0413* (2013.01); *H04L 1/1812* (2013.01); *H04L 1/1854* (2013.01);
(Continued)

(58) Field of Classification Search
CPC ....... H04L 1/1812; H04L 1/1854; H04L 5/14; H04W 36/0069; H04W 72/0413; H04W 72/042

See application file for complete search history.

(56) References Cited

U.S. PATENT DOCUMENTS 9,756,617 B2 * 9/2017 Baldemair .............. H04L 1/003
10,305,668 B2 * 5/2019 Yang .................... H04L 5/0055
(Continued)

FOREIGN PATENT DOCUMENTS

CN 102394685 A * 3/2012
CN 103516487 B * 11/2017
(Continued)

OTHER PUBLICATIONS

Apple Inc., Feature lead summary of remaining issues on potential enhancements to single Tx switched uplink for EN-DC, R1-1905781, 3GPP TSG RAN WG1 #96bis, Apr. 15, 2019, Xi'an, China.
(Continued)

*Primary Examiner* — Eric Nowlin
(74) *Attorney, Agent, or Firm* — Jefferson IP Law, LLP

(57) ABSTRACT

The disclosure relates to a communication method and a system for converging a $5^{th}$-Generation (5G) communication system for supporting higher data rates beyond a $4^{th}$-Generation (4G) system with a technology for Internet of Things (IoT). The disclosure may be applied to intelligent services based on the 5G communication technology and the IoT-related technology, such as a smart home, a smart building, a smart city, a smart car, a connected car, health care, digital education, a smart retail, security and safety services. A method performed by a terminal in a wireless communication system is provided. The method includes receiving a higher signal including a plurality of physical uplink control channel (PUCCH) resource information, determining a PUCCH format and resource for a hybrid
(Continued)

automatic repeat request (HARQ) feedback information corresponding to a physical downlink shared channel (PDSCH), and transmitting the HARQ feedback information based on the determined PUCCH format and the resource.

20 Claims, 13 Drawing Sheets

(51) Int. Cl.
  *H04L 5/14* (2006.01)
  *H04W 36/00* (2009.01)
(52) U.S. Cl.
  CPC ........... *H04L 5/14* (2013.01); *H04W 36/0069* (2018.08); *H04W 72/042* (2013.01)

(56) References Cited

U.S. PATENT DOCUMENTS

| | | | |
|---|---|---|---|
| 10,623,150 B2 * | 4/2020 | Cheng | H04L 5/14 |
| 11,082,195 B2 * | 8/2021 | Yang | H04L 27/0006 |
| 2015/0215079 A1 * | 7/2015 | Park | H04L 1/1854 370/280 |
| 2016/0037507 A1 * | 2/2016 | Baldemair | H04L 1/1621 370/329 |
| 2017/0280454 A1 * | 9/2017 | Kusashima | H04L 1/1812 |
| 2020/0351865 A1 * | 11/2020 | Choi | H04L 1/1864 |
| 2021/0105763 A1 * | 4/2021 | Takeda | H04L 1/1896 |

FOREIGN PATENT DOCUMENTS

| | | | | |
|---|---|---|---|---|
| CN | 103503527 B | * | 5/2018 | ........... H04L 5/1469 |
| EP | 2894798 A1 | * | 7/2015 | ........ H04W 72/0413 |
| EP | 2856723 B1 | * | 10/2019 | ........... H04L 1/1861 |
| EP | 3068161 B1 | * | 5/2021 | ........... H04L 1/1854 |
| EP | 3068181 B1 | * | 5/2021 | ........... H04L 1/1854 |
| KR | 20200053553 A | * | 5/2020 | ........ H04W 72/1273 |
| KR | 20200064043 A | * | 6/2020 | |
| TW | 202130145 A | * | 9/2020 | ........... H04L 1/1671 |
| WO | 2012/039570 A2 | | 3/2012 | |
| WO | WO-2015106554 A1 | * | 7/2015 | ........... H04L 1/1896 |
| WO | WO-2016035717 A1 | * | 3/2016 | ........ H04W 72/0413 |
| WO | WO-2016163720 A1 | * | 10/2016 | ........... H04L 5/0055 |
| WO | WO-2021067980 A1 | * | 4/2021 | ........... H04L 1/1671 |

OTHER PUBLICATIONS

Nokia et al., Discussion on single uplink operation enhancement for EN-DC, R1-1904721, 3GPP TSG RAN WG1 #96bis, Mar. 29, 2019, Xi'an, China.

ZET Corporation, Discussion on single Tx switched uplink solution for EN-DC, R1-1904155, 3GPP TSG RAN WG1 #96bis, Mar. 30, 2019, Xi'an, China.

Samsung, Enhancements to Single Tx Switched UL for EN-DC, R1-1904400, 3GPP TSG RAN WG1 #96bis, Mar. 29, 2019, Xi'an, China.

International Search Report dated Aug. 7, 2020, issued in International Application No. PCT/KR2020/005764.

Intel Corporation, Further consideration on NR-LTE co-existence, R1-1802419, 3GPP TSG-RAN WG1 Meeting #92, Feb. 17, 2018, Athens, Greece.

3rd Generation Partnership Project; Technical Specification Group Radio Access Network; NR; Physical layer procedures for control (Release 15), 3GPP TS 38 213 V15.0.1, Mar. 15, 2018.

European Search Report dated Oct. 14, 2021, issued in European Application No. 20798095.4.

* cited by examiner

METHOD AND APPARATUS FOR DETERMINING OF TRANSMISSION RESOURCES FOR UPLINK CHANNELS OF USE FOR DUAL CONNECTIVITY IN WIRELESS COMMUNICATION SYSTEM

CROSS-REFERENCE TO RELATED APPLICATION(S)

This application is based on and claims priority under 35 U.S.C. § 119(a) of a Korean patent application number 10-2019-0051359, filed on May 2, 2019, in the Korean Intellectual Property Office, and of a Korean patent application number 10-2019-0112871, filed on Sep. 11, 2019, in the Korean Intellectual Property Office, the disclosure of each of which is incorporated by reference herein in its entirety.

BACKGROUND

1. Field

The disclosure relates to a method and an apparatus for determining resources for dual connectivity in a wireless communication system. More particularly, the disclosure relates to a method and an apparatus for transmitting uplink channels for dual connectivity in a wireless communication system.

2. Description of Related Art

To meet the demand for wireless data traffic having increased since deployment of 4th generation (4G) communication systems, efforts have been made to develop an improved 5th generation (5G) or pre-5G communication system. Therefore, the 5G or pre-5G communication system is also called a 'Beyond 4G Network' or a 'Post LTE System'. The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems. In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like. In the 5G system, Hybrid FSK and QAM Modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The Internet, which is a human centered connectivity network where humans generate and consume information, is now evolving to the Internet of Things (IoT) where distributed entities, such as things, exchange and process information without human intervention. The Internet of Everything (IoE), which is a combination of the IoT technology and the Big Data processing technology through connection with a cloud server, has emerged. As technology elements, such as "sensing technology", "wired/wireless communication and network infrastructure", "service interface technology", and "Security technology" have been demanded for IoT implementation, a sensor network, a Machine-to-Machine (M2M) communication, Machine Type Communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing Information Technology (IT) and various industrial applications.

In line with this, various attempts have been made to apply 5G communication systems to IoT networks. For example, technologies, such as a sensor network, Machine Type Communication (MTC), and Machine-to-Machine (M2M) communication may be implemented by beamforming, MIMO, and array antennas. Application of a cloud Radio Access Network (RAN) as the above-described Big Data processing technology may also be considered to be as an example of convergence between the 5G technology and the IoT technology.

Accordingly, various attempts have been made to apply a 5G communication system to an IoT network. For example, 5G communication technology, such as a sensor network, machine-to-machine communication (M2M), and machine-type communication (MTC), is implemented by techniques, such as beamforming, MIMO, and array antenna. The application of a cloud radio access network (cloud RAN) as big-data processing technology described above is an example obtained by converging 5G technology and IoT technology.

Meanwhile, various studies have been conducted on a method for transmitting an uplink control channel in a communication system. In particular, a method for transmitting a physical uplink control channel (PUCCH) and a physical uplink shared channel (PUSCH) is discussed from various aspects.

The above information is presented as background information only to assist with an understanding of the disclosure. No determination has been made, and no assertion is made, as to whether any of the above might be applicable as prior art with regard to the disclosure.

SUMMARY

A user equipment (UE) capable of performing dual connectivity for long term evolution (LTE) and a new radio (NR) may separately transmit or receive data to or from LTE and NR cells.

Aspects of the disclosure are to address at least the above-mentioned problems and/or disadvantages and to provide at least the advantages described below. Accordingly, an aspect of the disclosure is to provide a method and an apparatus which enables a UE having dynamic power-sharing capability for uplink transmission to determine which uplink transmission is to be prioritized in the case where LTE and NR uplink transmissions temporally collide with each other although the LTE and NR uplink transmissions by the UE are not limited to a specific subframe or slot. A UE having semi-static power-sharing capability for uplink transmission performs LTE uplink transmission and NR uplink transmission in a time-division method. At this time, the UE may receive a first configuration that enables uplink transmission to be performed, for the LTE cell, only in a specific subframe, and according to the first configuration, hybrid automatic repeat request-acknowledgement (HARQ-ACK) for downlink data is limited to being transmitted only in the specific subframe. If a UE having semi-static power-sharing capability transmits uplink data, the location of a subframe performing initial transmission and retransmission may be the same or different for each radio frame according to the time division duplex (TDD) uplink-downlink (UL-DL) configuration of the LTE cell. Accordingly, by applying another second configuration according to the TDD UL-DL configuration of the LTE cell, a method and an apparatus for performing initial transmission and retransmission of LTE uplink data only in a limited specific subframe according to the first configuration are provided. In addition, if a UE receives only physical downlink shared channel (PDSCH) through one physical downlink control channel (PDCCH) in an LTE primary cell, receives only one PDCCH for DL semi persistent scheduling (SPS) release, or receives only one PDSCH without a corresponding PDCCH, a method and an apparatus for determining a plurality of physical uplink control channel (PUCCH) transmission resource of PUCCH format 3/4/5 are provided.

Additional aspects will be set forth in part in the description which follows and, in part, will be apparent from the description, or may be learned by practice of the presented embodiments.

In accordance with an aspect of the disclosure, a method performed by a terminal in a wireless communication system is provided. The method includes receiving a higher signal including a PUCCH resource information, determining a PUCCH format and resource for a hybrid automatic repeat request (HARQ) feedback information corresponding to a PDSCH and transmitting the HARQ feedback information based on the determined PUCCH format and the resource, wherein the PUCCH format uses a preset format and the resource corresponds to a first PUCCH resource among the plurality of PUCCH resource information, in case that Evolved universal mobile telecommunications system (UMTS) Terrestrial Radio Access (EUTRA) new radio (NR)—dual connectivity (EN-DC) is set in the terminal, time division duplex (TDD) frame structure is set in a primary cell (PCell) of the terminal, a reference TDD configuration information is set in the terminal, and a downlink assignment index (DAI) field value of a DCI format corresponding to the PDSCH is set in 1.

In accordance with another aspect the disclosure, a method performed by a base station in a wireless communication system is provided. The method includes transmitting, to a terminal, a higher signal including a plurality of PUCCH resource information, transmitting, to the terminal, a PDSCH and receiving, from the terminal, a HARQ feedback information corresponding to the PDSCH based on a PUCCH format and resource, wherein the PUCCH format uses a preset format and the resource corresponds to a first PUCCH resource among the plurality of PUCCH resource information, in case that Evolved UMTS EUTRA NR—EN-DC is set in the terminal, TDD frame structure is set in a PCell of the terminal, a reference TDD configuration information is set in the terminal, and a DAI field value of a DCI format corresponding to the PDSCH is set in 1.

In accordance with another aspect of the disclosure, a terminal in a wireless communication system is provided. The terminal includes a transceiver and a controller configured to receive, via the transceiver, a higher signal including a PUCCH resource information, to determine a PUCCH format and resource for a HARQ feedback information corresponding to a PDSCH, and to transmit, via the transceiver, the HARQ feedback information based on the determined PUCCH format and the resource, wherein the PUCCH format uses a preset format and the resource corresponds to a first PUCCH resource among the plurality of PUCCH resource information, in case that Evolved UMTS EUTRA NR—EN-DC is set in the terminal, TDD frame structure is set in a PCell of the terminal, a reference TDD configuration information is set in the terminal, and a DAI field value of a DCI format corresponding to the PDSCH is set in 1.

In accordance with another aspect of the disclosure, a base station in a wireless communication system is provided. The method includes a transceiver and a controller configured to transmitting, to a terminal via the transceiver, a higher signal including a plurality of PUCCH resource information, to transmit, to the terminal via the transceiver, a PDSCH, and to receive, from the terminal via the transceiver, a HARQ feedback information corresponding to the PDSCH based on a PUCCH format and resource, wherein the PUCCH format uses a preset format and the resource corresponds to a first PUCCH resource among the plurality of PUCCH resource information, in case that Evolved UMTS EUTRA NR—EN-DC is set in the terminal, TDD frame structure is set in a primary cell (PCell) of the terminal, a reference TDD configuration information is set in the terminal, and a DAI field value of a DCI format corresponding to the PDSCH is set in 1.

In accordance with another aspect of the disclosure, a method and an apparatus for determining resources for dual connectivity in a wireless communication system may be provided. In addition, according to an embodiment of the disclosure, a method and an apparatus for transmitting an uplink channel for a UE for dual connectivity in a wireless communication system may be provided.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

The same reference numerals are used to represent the same elements throughout the drawings.

DETAILED DESCRIPTION

Figure 1:
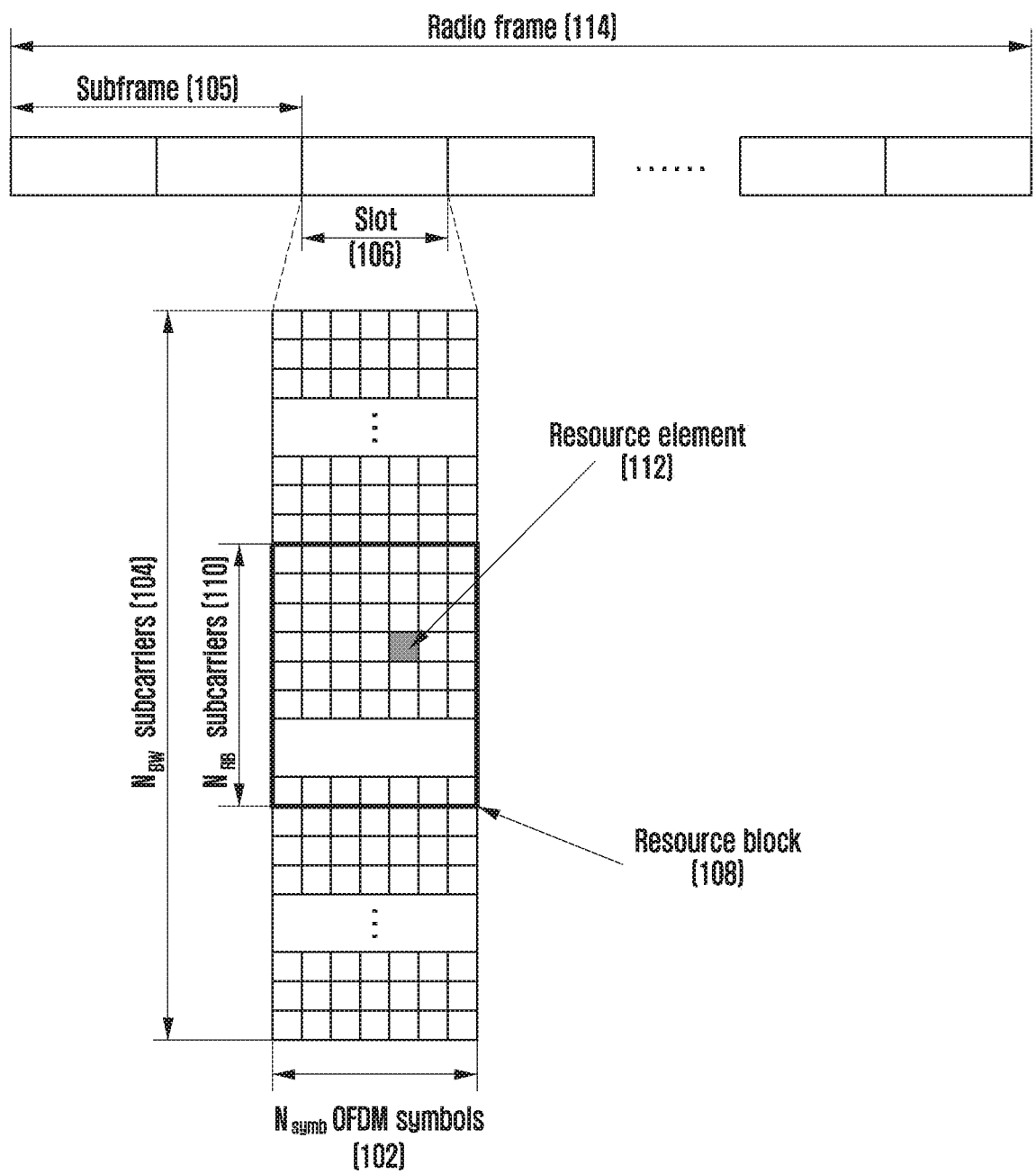
FIG. 1 illustrates a basic structure of a time-frequency domain in a long term evolution (LTE) system according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Here, it will be understood that each block in the flowchart illustrations, and combinations of blocks in the flowchart illustrations, can be implemented by computer program instructions. These computer program instructions can be provided to a processor of a general-purpose computer, special-purpose computer, or other programmable data processing apparatus to produce a machine, such that the instructions, which execute via the processor of the computer or other programmable data processing apparatus, create means for implementing the functions specified in the flowchart block or blocks. These computer program instructions may also be stored in a computer-usable or computer-readable memory that can direct a computer or other programmable data processing apparatus to function in a particular manner such that the instructions stored in the computer-usable or computer-readable memory produce an article of manufacture including instruction means that implement the function specified in the flowchart block or blocks. The computer program instructions may also be loaded onto a computer or other programmable data-processing apparatus to cause a series of operations to be performed on the computer or other programmable data-processing apparatus to produce a computer-implemented process such that the instructions that execute on the computer or other programmable data-processing apparatus provide operations for implementing the functions specified in the flowchart block or blocks.

Each block of the flowchart illustrations may represent a module, segment, or portion of code, which includes one or more executable instructions for implementing the specified logical function(s). It should also be noted that in some alternative implementations, the functions noted in the blocks may occur out of the order shown. For example, two blocks shown in succession may in fact be executed substantially concurrently or the blocks may sometimes be executed in the reverse order, depending upon the functionality involved.

As used herein, the term "unit" refers to a software element or a hardware element, such as a field programmable gate array (FPGA) or an application specific integrated circuit (ASIC), which performs a predetermined function. However, "unit" does not always have a meaning limited to software or hardware. The "unit" may be constructed either to be stored in an addressable storage medium or to be executed on one or more processors. Therefore, the "unit" includes, for example, software elements, object-oriented software elements, class elements or task elements, processes, functions, properties, procedures, sub-routines, segments of program code, drivers, firmware, micro-codes, circuits, data, database, data structures, tables, arrays, and parameters. The elements and functions provided by the "unit" may be combined into a smaller number of elements or "units", or may be divided into a larger number of elements or "units". Moreover, the elements and "units" may be implemented to be reproduced one or more CPUs within a device or a security multimedia card.

Hereinafter, the embodiments will be described with reference to the accompanying drawings. In describing the disclosure below, a detailed description of related known configurations or functions incorporated herein will be omitted if it is determined that the detailed description thereof would unnecessarily obscure the subject matter of the disclosure. The terms used below are terms defined based on the functions in the disclosure, and may differ according to a user or operator's intentions or customs. Therefore, the definitions of the terms should be made based on the content throughout the specification.

Further, in describing embodiments, the disclosure will be directed to an orthogonal frequency division multiplexing (OFDM)-based wireless communication system, particularly the $3^{rd}$ generation partnership project (3GPP) Evolved universal mobile telecommunications system (UMTS) Terrestrial Radio Access (EUTRA) standard, but it will be understood by those skilled in the art that the main gist of the disclosure may also be applied to other communication systems having similar technical backgrounds and channel formats, with slight modification, without substantially departing from the scope of the disclosure.

Meanwhile, research on the coexistence of the new $5^{th}$ generation (5G) communication (or new radio (NR) communication in the disclosure) and the existing long term evolution (LTE) communication in the same spectrum is underway in the mobile communication system.

The disclosure relates to a wireless communication system, and more particularly, to a method and an apparatus for transmitting or receiving data to or from each communication system by a terminal, wherein different wireless communication systems coexist in one carrier frequency or a plurality of carrier frequencies and data transmission or reception can be performed in at least one communication system among different communication systems.

Generally, a mobile communication system has been developed to provide voice service while ensuring a user's mobility. However, the mobile communication system is gradually expanding from voice to include data service, and has now developed to the extent of providing high-speed data service. However, mobile communication systems currently providing service simultaneously face a lack of resources and user demand for higher-speed services, and therefore a more advanced mobile communication system is required.

As a system under development in the next generation mobile communication system in response to this demand, development of a LTE standard is underway in the 3GPP. LTE is a technology that implements high-speed packet-based communications with transmission rates of up to 100 Mbps. To this end, various methods are discussed, for example, a method for reducing the number of nodes located on a communication path by simplifying the structure of a network, and a method for making wireless protocols as closer to a wireless channel as possible.

The LTE system adopts a hybrid automatic repeat request (HARQ) method in which corresponding data is retransmitted in a physical layer if decoding failure occurs upon an initial transmission. In the HARQ method, if a receiver fails to correctly decode data, a receiver transmits information indicating decoding failure (negative acknowledgment: NACK) to a transmitter so as to enable the transmitter to retransmit the corresponding data in the physical layer. The receiver combines the data, retransmitted by the transmitter, with existing data, decoding of which failed, and thereby improving data reception performance. In addition, if data decoding is successful, the receiver may transmit information (acknowledgment (ACK)) indicating that decoding is successful to the transmitter so as to enable the transmitter to transmit new data.

FIG. 1 illustrates a basic structure of a time-frequency domain, which is a radio resource domain in which data or a control channel is transmitted in a downlink of an LTE system according to an embodiment of the disclosure.

Referring to FIG. 1, the horizontal axis indicates a time domain, and the vertical axis indicates a frequency domain. The minimum transmission unit in the time domain is an OFDM symbol, and $N_{symb}$ OFDM symbols 102 may be collected to configure one slot 106, and two slots configure one subframe 105. The length of the slot is 0.5 ms and the length of the subframe is 1.0 ms. The radio frame 114 is a time-domain unit configured by 10 subframes. The minimum transmission unit in the frequency domain is a subcarrier, and the total system transmission bandwidth is configured by a total of NBW 104 subcarriers.

The basic unit of the time-frequency domain is a resource element (RE) 112, and the RE may be represented by an OFDM symbol index and a subcarrier index. A resource block (RB or physical resource block (PRB)) 108 is defined by $N_{symb}$ consecutive OFDM symbols 102 in the time domain and $N_{RB}$ consecutive subcarriers 110 in the frequency domain. Thus, one RB 108 is configured by $N_{symb} \times N_{RB}$ REs 112. In general, the minimum transmission unit of data is the RB unit. In the LTE system, $N_{symb}$ is 7, $N_{RB}$ is 12, and $N_{BW}$ and $N_{RB}$ are generally proportional to the bandwidth of the system transmission band. The data rate increases in proportion to the number of RBs scheduled to a UE. The LTE system defines and operates six transmission bandwidths. In the case of an FDD system in which the downlink and the uplink are classified by frequency, the downlink transmission bandwidth and the uplink transmission bandwidth may be different from each other. The channel bandwidth represents the RF bandwidth, corresponding to the system transmission bandwidth. Table 1 shows the correspondence between system transmission bandwidth and channel bandwidth defined in the LTE system. For example, an LTE system having a 10 MHz channel bandwidth includes a transmission bandwidth of 50 RBs.

TABLE 1

| Channel bandwidth $BW_{channel}$ [MHz] | 1.4 | 3 | 5 | 10 | 15 | 20 |
|---|---|---|---|---|---|---|
| Transmission bandwidth configuration | 6 | 15 | 25 | 50 | 75 | 100 |

Downlink control information is transmitted within the first N OFDM symbols in the subframe. In general, N={1, 2, 3 }. Therefore, the value of N varies according to each subframe according to the amount of control information to be transmitted in the current subframe. The control information includes a control channel transmission interval indicator, indicating the number of OFDM symbols via which control information is transmitted, scheduling information for downlink data or uplink data, and an HARQ ACK/NACK signal.

In the LTE system, scheduling information for downlink data or uplink data is transmitted from a base station to a UE through downlink control information (DCI). An uplink (UL) refers to a radio link through which a UE transmits data or control signals to a base station, and a downlink (DL) refers to a radio link through which a base station transmits data or control signals to a terminal. The DCI is defined in various formats, and a DCI format may be determined and applied for operation based on whether scheduling information is for uplink data (UL grant) or for downlink data (DL grant), whether the DCI is compact DCI having a small amount of control information, whether or not spatial multiplexing using multiple antennas is applied, whether the DCI is DCI for power control, and the like. For example, DCI format 1, corresponding to scheduling control information about downlink data (DL grant), may be configured to include at least the following pieces of control information.

Resource allocation type 0/1 flag: indicates whether the resource allocation method is type 0 or type 1. Type 0 allocates resources in units of resource block group (RBG) by applying a bitmap method. In the LTE system, the basic unit of scheduling is a resource block (RB), represented by time- and frequency-domain resources, and the RBG is configured as a plurality of RBs and serves as a basic unit of scheduling in the type 0 method. Type 1 allows a specific RB to be allocated within the RBG.

Resource block assignment: indicates the RB allocated to data transmission. The resources to be represented are determined according to the system bandwidth and the resource allocation method.

Modulation and coding method (MCS): indicates the modulation method used for data transmission and the size of the transport block, which is the data to be transmitted.

HARQ process number: indicates the HARQ process number.

New data indicator: indicates HARQ initial transmission or retransmission.

Redundancy version: indicates the redundancy version of HARQ.

Transmit power control (TCP) command for physical uplink control channel (PUCCH): indicates a transmission power control command for a PUCCH, which is an uplink control channel.

The DCI is transmitted through a PDCCH or an enhanced PDCCH (EPDCCH) through a channel coding and modulation process.

Generally, the DCI is independently channel-coded for each UE, and is then configured and transmitted as an independent PDCCH. The PDCCH is mapped and transmitted during the control channel transmission interval in the time domain. The location of the frequency domain to which the PDCCH is mapped is determined by the identifier (ID) of each UE and is propagated to (distributed over) the entire system transmission band.

Downlink data is transmitted through a physical downlink shared channel (PDSCH), which is a physical channel for downlink data transmission. The PDSCH is transmitted after the control channel transmission interval. The scheduling information, such as the specific mapping location and modulation method in the frequency domain is indicated by DCI transmitted through the PDCCH.

Via an MCS, which is configured by 5 bits of the control information included in the DCI, the base station notifies the UE of the modulation method applied to the PDSCH and the size of data to be transmitted (transport block size (TBS). The TBS corresponds to the size before channel coding for error correction is applied to data (transport block, TB) to be transmitted by the base station.

The modulation methods supported by the LTE system are quadrature phase-shift keying (QPSK), 16 quadrature amplitude modulation (QAM) and 64 QAM, the modulation orders ($Q_m$) of which correspond to 2, 4, and 6, respectively. For example, in the case of QPSK modulation, 2 bits are transmitted per symbol. In the case of 16 QAM modulation, 4 bits are transmitted per symbol. In the case of 64 QAM modulation, 6 bits are transmitted per symbol.

Unlike LTE Rel-8, 3GPP LTE Rel-10 adopted a bandwidth extension technology in order to support transmission of a larger amount of data. Technology called bandwidth extension or carrier aggregation (CA) may expand the band and thus increase the amount of data transmission through the expanded band compared to an LTE Rel-8 terminal which transmits data in one band. Each of the bands is called a component carrier (CC), and the LTE Rel-8 terminal is defined to have one component carrier for each of the downlink and the uplink. Further, a group of uplink component carriers connected to downlink component carriers through SIB-2 is called a cell. An SIB-2 connection relationship between the downlink component carriers and the uplink component carriers is transmitted through a system signal or a higher-layer signal. The terminal supporting CA may receive downlink data through a plurality of serving cells and transmit uplink data.

In LTE Rel-10, if a base station has difficulty transmitting a physical downlink control channel (PDCCH) to a specific UE in a specific serving cell, the base station may transmit a PDCCH in another serving cell and configure a carrier indicator field (CIF) as a field indicating that the corresponding PDCCH is a physical downlink shared channel (PDSCH) or a physical uplink shared channel (PUSCH) of the another serving cell. The CIF may be configured in the terminal supporting CA. The CIF may be determined to indicate another serving cell by adding 3 bits to the PDCCH information in a specific serving cell, and the CIF is included only in the case where a higher-layer signal is configured to perform cross-carrier scheduling. If a higher-layer signal is not configured to perform cross-carrier scheduling but is configured to perform self-scheduling, the CIF is not included, in which case cross-carrier scheduling is not performed. If the CIF is included in the downlink assignment information (DL assignment), the CIF is defined to indicate a serving cell to which a PDSCH to be scheduled by the DL assignment is transmitted. If the CIF is included in the uplink resource allocation information (UL grant), the CIF is defined to indicate the serving cell to which the PUSCH scheduled by the UL grant is transmitted.

As described above, in LTE Rel-10, carrier aggregation (CA), which is a bandwidth expansion technology, is defined, and thus a plurality of serving cells may be configured in the UE. The UE periodically or aperiodically transmits channel information about a plurality of serving cells to the base station in order to perform data scheduling of the base station. The base station schedules and transmits data for each carrier, and the terminal transmits A/N feedback of data transmitted for each carrier. LTE Rel-10 is designed to transmit a maximum of 21 bits of A/N feedback and if transmission of A/N feedback and transmission of channel information overlap in one subframe, LTE Rel-10 is designed to transmit the A/N feedback and discard the channel information. LTE Rel-11 is designed to multiplex A/N feedback and channel information of one cell and transmit A/N feedback corresponding to the maximum of 22 bits and the channel information of one cell in transmission resources of PUCCH format 3 via PUCCH format 3.

In LTE Rel-13, a maximum of 32 serving-cell configuration scenarios are assumed. LTE-Rel 13 conceptually includes expanding the number of serving cells up to a maximum of 32 serving cells not only through a licensed band but also through an unlicensed band. Further, LTE Rel-13 includes provision of LTE service in an unlicensed band, such as a band of 5 GHz, based on limitation of the number of licensed bands, such as the LTE frequency, which is called licensed assisted access (LAA). LAA applies a carrier aggregation technology of LTE to support operation of the LTE cell, corresponding to the licensed cell, as a primary cell (PCell) and the LAA cell, corresponding to the unlicensed band, as a secondary cell (SCell). Accordingly, as in LTE, feedback generated in the LAA cell corresponding to the SCell should be transmitted only in the PCell, and the LAA cell may freely apply a downlink subframe and an uplink subframe. Unless specially mentioned in this specification, LTE refers to all technologies evolved from LTE, such as LTE-A and LAA.

In general, a TDD communication system uses a common frequency for the downlink and the uplink, but separates transmission and reception of the uplink signal and the downlink signal in the time domain. In LTE TDD, uplink or downlink signals are divided and transmitted for each subframe. Subframes for uplink and downlink may be divided equally in the time domain according to the traffic load of the uplink and downlink and operated, more subframes may be allocated to the downlink and operated, or more subframes may be allocated to the uplink and operated. In LTE, the length of the subframe is 1 ms, and 10 subframes are gathered to form one radio frame.

TABLE 2

| Uplink-downlink configuration | Subframe number | | | | | | | | | |
|---|---|---|---|---|---|---|---|---|---|---|
| | 0 | 1 | 2 | 3 | 4 | 5 | 6 | 7 | 8 | 9 |
| 0 | D | S | U | U | U | D | S | U | U | U |
| 1 | D | S | U | U | D | D | S | U | U | D |
| 2 | D | S | U | D | D | D | S | U | D | D |
| 3 | D | S | U | U | U | D | D | D | D | D |
| 4 | D | S | U | U | D | D | D | D | D | D |
| 5 | D | S | U | D | D | D | D | D | D | D |
| 6 | D | S | U | U | U | D | S | U | U | D |

Table 2 shows a TDD uplink-downlink (UL-DL) configuration defined in LTE. In Table 1, "D" denotes a subframe configured for downlink transmission, "U" denotes a subframe configured for uplink transmission, and "S" denotes a special subframe configured by a downlink pilot time slot (DwPTS), a guard period (GP), and an uplink pilot time slot (UpPTS). In the DwPTS, control information can be transmitted to the downlink, as in a general subframe. If the length of the DwPTS is long enough according to the configuration state of the special subframe, downlink data transmission is also possible. The GP is a period for accepting transition of a transmission state from the downlink to the uplink, and the length of the GP is determined according to the network configuration and the like. The UpPTS is used for sounding reference signal (SRS) transmission of a UE, necessary for estimating the uplink channel state, or random access channel (RACH) transmission of the UE for random access.

For example, in TDD UL-DL configuration #6, downlink data and downlink control information can be transmitted to subframes #0, #5 and #9, and uplink data and uplink control information can be transmitted to subframes #2, #3, #4, #7, and #8. In subframes #1 and #6, which are special subframes, the downlink control information and the downlink data can be transmitted according to the case, and the SRS or RACH can be transmitted to the uplink.

In a TDD system, since the downlink or uplink signal transmission is allowed only during a specific time interval, it is necessary to define a specific timing relationship between related uplink and downlink physical channels, such as a control channel for data scheduling, a scheduled data channel, and an HARQ ACK/NACK (or HARQ-ACK) channel corresponding to a data channel First, in the LTE TDD system, the uplink/downlink timing relationship between a physical uplink shared channel (PDSCH), which is a physical channel for downlink data transmission, and a corresponding physical uplink control channel (PUCCH) or physical uplink shared channel (PUSCH), which is a physical channel through which uplink HARQ ACK/NACK is transmitted, is as follows:

If the UE receives the PDSCH transmitted to the subframe (n−k) from a base station, the UE transmits the uplink HARQ ACK/NACK for the PDSCH to the uplink subframe n. Here, k is an element of the set K, and K is as defined in Table 3.

TABLE 3

| UL-DL Configuration | Subframe n | | | | | | | | | |
|---|---|---|---|---|---|---|---|---|---|---|
| | 0 | 1 | 2 | 3 | 4 | 5 | 6 | 7 | 8 | 9 |
| 0 | — | — | 6 | — | 4 | — | — | 6 | — | 4 |
| 1 | — | — | 7, 6 | 4 | — | — | — | 7, 6 | 4 | — |
| 2 | — | — | 8, 7, 4, 6 | — | — | — | — | 8, 7, 4, 6 | — | — |
| 3 | — | — | 7, 6, 11 | 6, 5 | 5, 4 | — | — | — | — | — |
| 4 | — | — | 12, 8, 7, 11 | 6, 5, 4, 7 | — | — | — | — | — | — |
| 5 | — | — | 13, 12, 9, 8, 7, 5, 4, 11, 6 | — | — | — | — | — | — | — |
| 6 | — | — | 7 | 7 | 5 | — | — | 7 | 7 | — |

Table 4 shows the subframe through which a corresponding uplink HARQ ACK/NACK is transmitted, in the case where a PDSCH is transmitted in each downlink subframe (D) or a special subframe (S) n in each TDD UL-DL configuration, and it is rearranged according to the definition of Table 3.

TABLE 4

| Subframe n UL-DL Configuration | 0 | 1 | 2 | 3 | 4 | 5 | 6 | 7 | 8 | 9 |
|---|---|---|---|---|---|---|---|---|---|---|
| 0 | D 4 | S 6 | U | U | U | D 4 | S 6 | U | U | U |
| 1 | D 7 | S 6 | U | U | D 4 | D 7 | S 6 | U | U | D 4 |
| 2 | D 7 | S 6 | U | D 4 | D 8 | D 7 | S 6 | U | D 4 | D 8 |
| 3 | D 4 | S 11 | U | U | U | D 7 | D 6 | D 6 | D 5 | D 5 |
| 4 | D 12 | S 11 | U | U | D 8 | D 7 | D 7 | D 6 | D 5 | D 4 |
| 5 | D 12 | S 11 | U | D 9 | D 8 | D 7 | D 6 | D 5 | D 4 | D 13 |
| 6 | D 7 | S 7 | U | U | U | D 7 | S 7 | U | U | D 5 |

Figure 2:
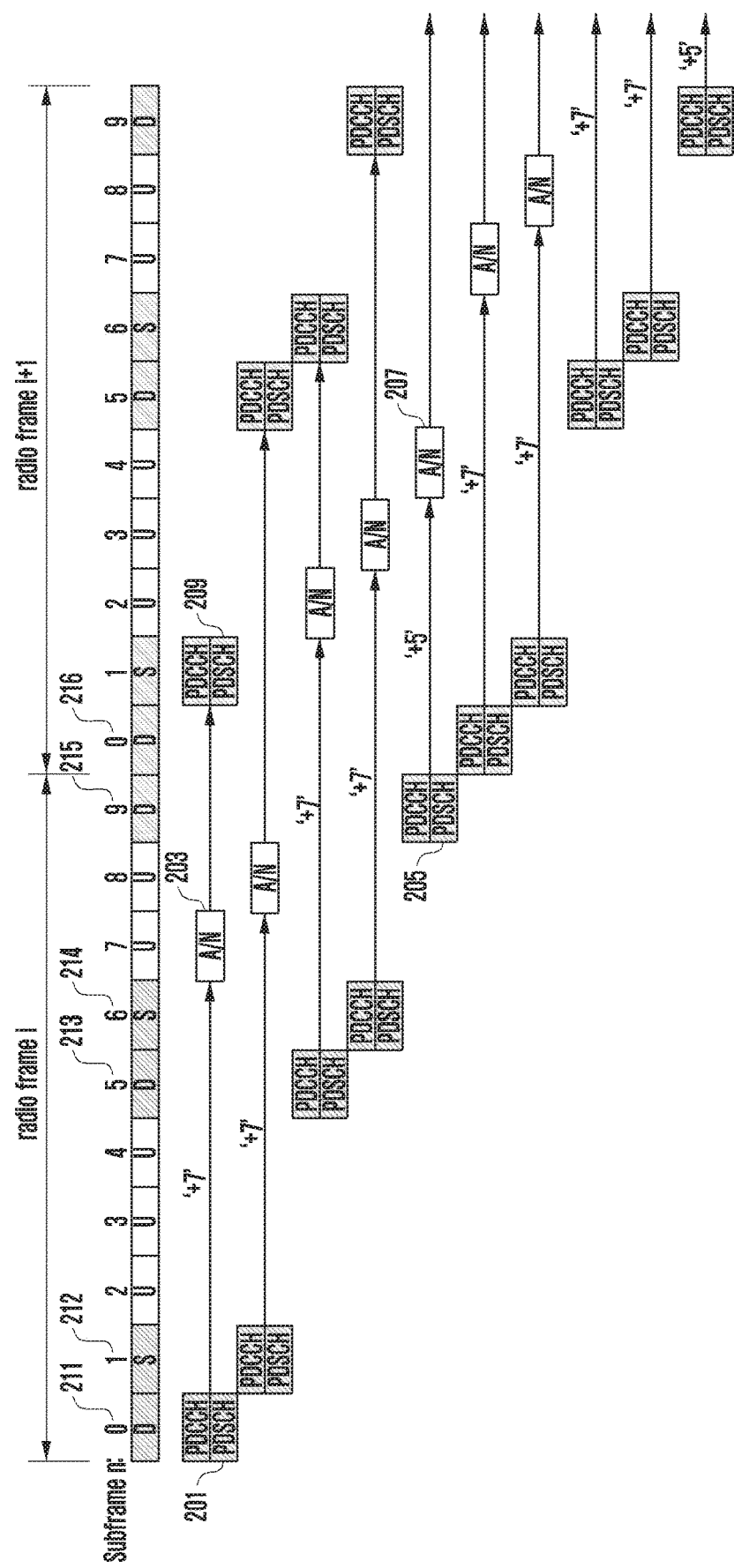
FIG. 2 illustrates an operation of a subframe in an LTE time division duplex (TDD) frame according to an embodiment of the disclosure.

FIG. 2 illustrates an operation of a subframe in a TDD frame according to an embodiment of the disclosure.

Referring to FIG. 2, Table 4 shown above is described with reference to FIG. 2 below. Here, FIG. 2 exemplarily illustrates the subframe through which a corresponding uplink HARQ ACK/NACK is transmitted, according to the definition of Table 4, in the case where a PDSCH is transmitted to each downlink subframe or a special subframe in each TDD UL-DL configuration #6 of Table 4.

For example, the uplink HARQ ACK/NACK corresponding to a PDSCH 201, which is transmitted to subframe #0 of radio frame i by a base station, is transmitted to subframe #7 of radio frame i by a UE (indicated by reference numeral 203). At this time, downlink control information (DCI) including scheduling information for the PDSCH 201 is transmitted through a PDCCH to the same subframe as the subframe to which the PDSCH is transmitted. As another example, the uplink HARQ ACK/NACK corresponding to PDSCH 205, which is transmitted by the base station in subframe #9 of radio frame i, is transmitted by the UE in subframe #4 of radio frame i+1 (indicated by reference numeral 207). Similarly, downlink control information (DCI) including scheduling information for the PDSCH 205 is transmitted through the PDCCH to the same subframe as the subframe to which the PDSCH is transmitted.

In the LTE system, downlink HARQ adopts an asynchronous HARQ method in which the data retransmission time is not fixed. For example, if NACK feedback with respect to HARQ data initially transmitted by the base station is provided from the UE, the base station freely determines the transmission time for the next HARQ data retransmission attempt through a scheduling operation. The UE buffers HARQ data, which is determined to be an error as a result of decoding the received data for the HARQ operation, and then combines the HARQ data with subsequently retransmitted HARQ data. At this time, in order to maintain the reception buffer capacity of the UE within a predetermined limit, the maximum number of downlink HARQ processes for each TDD UL-DL configuration is defined as shown in Table 5. One HARQ process is mapped to one subframe in the time domain.

TABLE 5

| TDD UL/DL configuration | Maximum number of HARQ processes |
|---|---|
| 0 | 4 |
| 1 | 7 |
| 2 | 10 |
| 3 | 9 |
| 4 | 12 |
| 5 | 15 |
| 6 | 6 |

Referring to FIG. 2, the UE decodes the PDSCH 201 transmitted to subframe #0 of radio frame i by the base station, and if it is determined to be an error, the UE transmits NACK to subframe #7 of radio frame i (indicated by reference numeral 203). Upon receiving the NACK, the base station configures the retransmission data for the PDSCH 201 as the PDSCH 209 and transmits the PDSCH together with the PDCCH. FIG. 2 exemplifies the case where the retransmission data is transmitted to subframe #1 of radio frame i+1 by considering that the maximum number of downlink HARQ processes of TDD UL-DL configuration #6 is 6 according to the definition of Table 5. For example, there are a total of 6 downlink HARQ processes 211, 212, 213, 214, 215, and 216 between the initial transmission PDSCH 201 and the retransmission PDSCH 209.

Unlike the downlink HARQ in the LTE system, the uplink HARQ adopts a synchronous HARQ method having a fixed data transmission time point. For example, the uplink/downlink timing relationship between a physical uplink shared channel (PUSCH), which is a physical channel for uplink data transmission, and a physical hybrid indicator channel (PHICH), which is a physical channel through which a downlink HARQ ACK/NACK corresponding to the PUSCH is transmitted, is fixed by the following rules.

When the UE receives the PDCCH including the uplink scheduling control information transmitted to the subframe n by the base station or the PHICH through which the downlink HARQ ACK/NACK is transmitted, the UE transmits uplink data corresponding to the control information to the subframe (n+k) through PUSCH. Here, k is as defined in Table 6.

TABLE 6

| TDD UL/DL Configuration | DL subframe number n | | | | | | | | | |
|---|---|---|---|---|---|---|---|---|---|---|
| | 0 | 1 | 2 | 3 | 4 | 5 | 6 | 7 | 8 | 9 |
| 0 | 4 | 6 | | | | 4 | 6 | | | |
| 1 | | 6 | | | 4 | | 6 | | | 4 |
| 2 | | | | 4 | | | | | 4 | |

TABLE 6-continued

| TDD UL/DL Configuration | DL subframe number n | | | | | | | | | |
|---|---|---|---|---|---|---|---|---|---|---|
| | 0 | 1 | 2 | 3 | 4 | 5 | 6 | 7 | 8 | 9 |
| 3 | 4 | | | | | | | | 4 | 4 |
| 4 | | | | | | | | | 4 | 4 |
| 5 | | | | | | | | | 4 | |
| 6 | 7 | 7 | | | | 7 | 7 | | | 5 |

Further, if the UE receives PHICH transferring the downlink HARQ ACK/NACK to the subframe i from the base station, the PHICH corresponds to the PUSCH, which is transmitted to a subframe (i–k) by the UE. Here, k is as defined in Table 7.

TABLE 7

| TDD UL/DL Configuration | DL subframe number i | | | | | | | | | |
|---|---|---|---|---|---|---|---|---|---|---|
| | 0 | 1 | 2 | 3 | 4 | 5 | 6 | 7 | 8 | 9 |
| 0 | 7 | 4 | | | | 7 | 4 | | | |
| 1 | | 4 | | | 6 | | 4 | | | 6 |
| 2 | | | | 6 | | | | | 6 | |
| 3 | 6 | | | | | | | | 6 | 6 |
| 4 | | | | | | | | | 6 | 6 |
| 5 | | | | | | | | | 6 | |
| 6 | 6 | 4 | | | | | 7 | 4 | | 6 |

Figure 3:
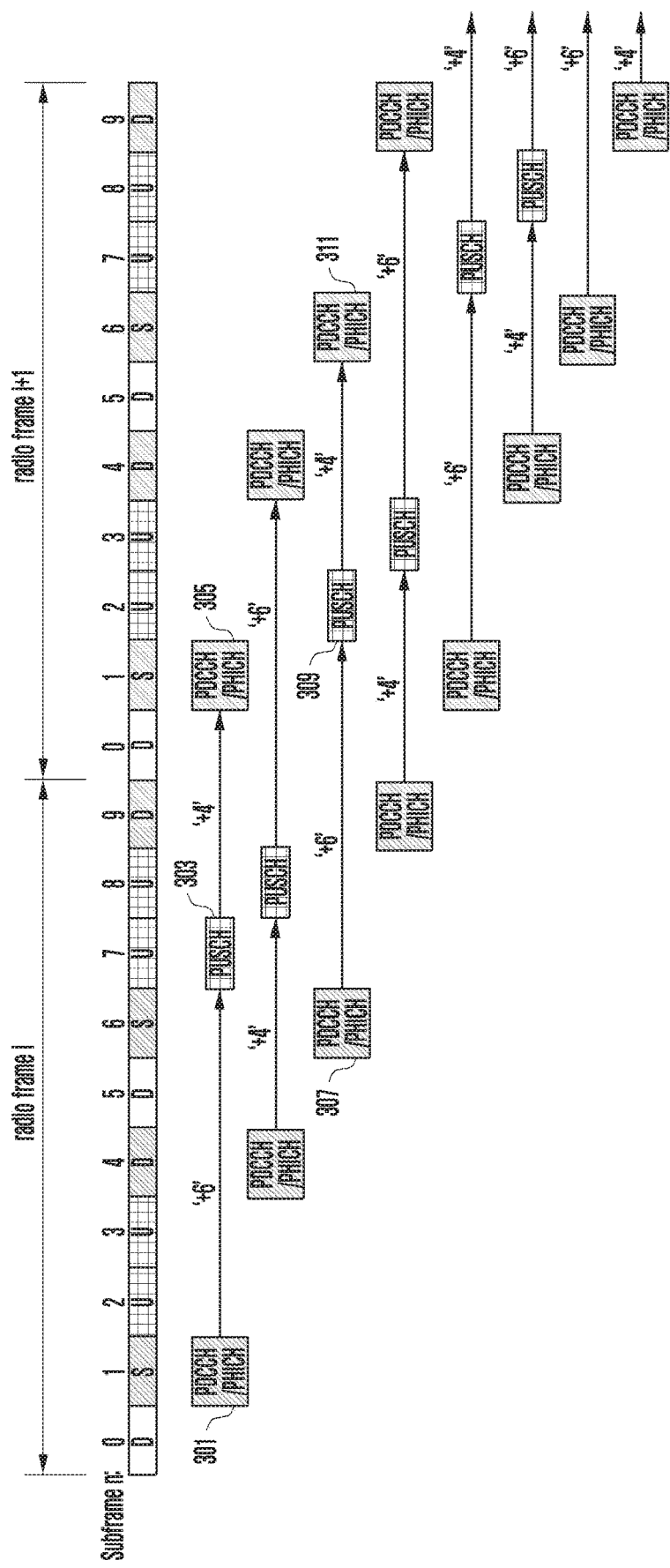
FIG. 3 illustrates an operation of a subframe in an LTE TDD frame according to an embodiment of the disclosure.

FIG. 3 illustrates an operation of a subframe in a TDD frame according to an embodiment of the disclosure.

Referring to FIG. 3, in the case of TDD UL-DL configuration #1, if a PDCCH or a PHICH is transmitted to each downlink or special subframe, the subframe to which the corresponding PUSCH is transmitted, and the subframe to which a PHICH corresponding to the PUSCH is transmitted are illustrated according to the definitions of Table 6 and Table 7.

For example, the uplink PUSCH corresponding to the PDCCH or PHICH 301, which is transmitted to subframe #1 of radio frame i by the base station, is transmitted from subframe #7 of radio frame i by the UE (indicated by reference numeral 303). In addition, the base station transmits the PHICH or PDCCH corresponding to the PUSCH to the UE in subframe #1 of radio frame i+1 (indicated by reference numeral 305). As another example, an uplink PUSCH corresponding to the PDCCH or PHICH 307 transmitted to subframe #6 of radio frame i by the base station is transmitted to subframe #2 of radio frame i+1 by the UE (indicated by reference numeral 309). In addition, the base station transmits the PHICH or PDCCH corresponding to the PUSCH to the UE in subframe #6 of radio frame i+1 (indicated by reference numeral 311).

In the LTE TDD system, the downlink transmission of the PDCCH or the PHICH corresponding to the PUSCH is limited in the specific downlink subframe in relation to the PUSCH transmission, thereby guaranteeing the minimum transmission/reception processing time of the base station and the UE. For example, in the case of TDD UL-DL configuration #1 of FIG. 3, in subframes #0 and #5, the PDCCH for scheduling the PUSCH or the PHICH corresponding to the PUSCH is not transmitted to downlink.

On the other hand, as a post-LTE communication system, a 5th-generation wireless cellular communication system (hereinafter, referred to as "5G" or "NR" in the specification) should be capable of freely satisfying the various requirements of users and service providers, so that services that meet various requirements may be supported.

Accordingly, 5G may define various 5G services, such as enhanced mobile broadband communication (hereinafter, referred to as eMBB in this specification), massive machine-type communication (hereinafter, referred to as mMTC in this specification), and ultra-reliable and low-latency communications (hereinafter, referred to as URLLC in this specification) as technology for satisfying requirements selected for 5G services, among requirements of a maximum UE transmission rate of 20 Gbps, a maximum UE speed of 500 km/h, a maximum delay time of 0.5 ms, and a UE access density of 1,000,000 UEs/km².

For example, in order to provide eMBB in 5G, a maximum downlink UE transmission rate of 20 Gbps and a maximum uplink UE transmission rate of 10 Gbps should be provided from the viewpoint of one base station. In addition, the average transmission rate that the UE actually experiences needs to be increased. In order to satisfy these requirements, improvement of transmission/reception technologies, including further improved multi-input multi-output transmission technology, is needed.

In addition, in order to support application services, such as those of the IoT, mMTC is under consideration in 5G. The mMTC needs to meet requirements of supporting access by massive numbers of terminals within a cell, improving coverage of the UE, increasing effective battery lifetime, and reducing the cost of the UE in order to efficiently support IoT services. The IoT is attached to various sensors and devices to provide a communication function, and thus needs to support a large number of UEs within the cell (for example, 1,000,000 UEs/km²). Further, in the mMTC, the UE is highly likely to be located in a shade area, such as the basement of a building or an area that cannot be covered by the cell due to characteristics of the service, and thus mMTC requires wider coverage than the coverage provided by eMBB. The mMTC is highly likely to be configured as a cheap UE, and it is difficult to frequently change a battery of such a UE, so a long battery life time is needed.

Finally, the URLLC is cellular-based wireless communication used for a particular purpose and corresponds to a service used for remote control of a robot or a machine device, industrial automation, unmanned aerial vehicles, remote health control, and emergency notification, and thus needs to provide ultra-low-latency and ultra-reliable communication. For example, the URLLC should have a maximum delay time shorter than 0 5 ms and is also required to provide a packet error rate equal to or lower than $10^{-5}$. Therefore, for the URLLC, a transmission time interval (TTI) smaller than that of a 5G service, such as eMBB should be provided, and additionally, design for allocation of wide resources in a frequency band is required.

The services under consideration in the 5th-generation wireless cellular communication system should be provided as a single framework. For example, in order to efficiently manage and control resources, it is preferable to perform control and transmission such that the services are integrated into one system rather than to independently operate the services.

Figure 4:
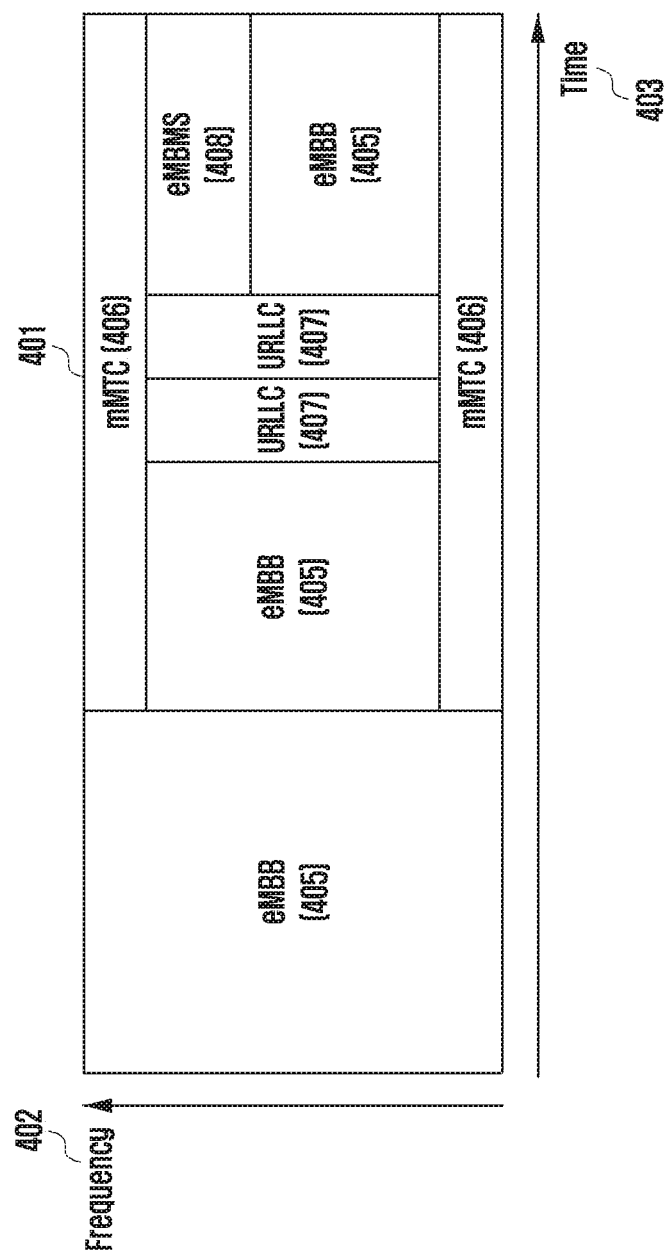
FIG. 4 illustrates an operation in which $5^{th}$ generation (5G) services are multiplexed in one system and transmitted according to an embodiment of the disclosure.

FIG. 4 illustrates an operation in which services under consideration in 5G are transmitted to one system according to an embodiment of the disclosure.

Referring to FIG. 4, the frequency-time resources 401 used by 5G may include a frequency axis 402 and a time axis 403. FIG. 4 illustrates an example in which eMBB 405, mMTC 406, and URLLC 407 are operated within one framework. Further, as a service that can be additionally considered in 5G, an enhanced mobile broadcast/multicast service (eMBMS) 408 for providing a cellular-based broadcast service may be considered. The services under consideration for 5G, such as the eMBB 405, the mMTC 406, the URLLC 407, and the eMBMS 408, may be multiplexed through time-division multiplexing (TDM) or frequency-division multiplexing (FDM) within one system frequency bandwidth operated in 5G, and spatial-division multiplexing may also be considered. In the case of the eMBB 405, it is preferable to occupy and transmit on as large a frequency bandwidth as possible for a particular time in order to provide the increased data transmission rate which has been described in the above. Accordingly, it is preferable that the service of the eMBB 405 be time-division-multiplexed with another service within the system transmission bandwidth 401 and transmitted, but it is also preferable that the service of the eMBB be frequency-division-multiplexed (FDM) with other services within the system transmission bandwidth and transmitted according to the need of the other services.

Unlike other services, the mMTC 406 requires an increased transmission interval in order to secure wider coverage, and may secure the coverage by repeatedly transmitting the same packet within the transmission interval. In addition, in order to reduce the terminal complexity and price, the transmission bandwidth within which the terminal can perform reception is limited. In the case of considering the requirements described above, it is preferable that the mMTC 406 be frequency-division multiplexed (FDM) with other services within the transmission system bandwidth 401 of 5G.

It is preferable that the URLLC 407 have a shorter transmission time interval (TTI) compared to other services in order to meet the ultra-low-latency requirement of the service. In addition, in order to meet the ultra-reliable requirement, a low coding rate is needed, so it is preferable to have a wide bandwidth from the aspect of frequency. Upon considering the requirements of the URLLC 407, it is preferable that the URLLC 407 be time-division multiplexed with other services within the transmission system bandwidth 401 of 5G.

The aforementioned services may have different transmission or reception methods and transmission or reception parameters in order to meet the requirements of the services. For example, the respective services may have different numerologies depending on the requirements thereof. The numerology includes a cyclic prefix (CP) length, subcarrier spacing, an OFDM symbol length, and a transmission time interval (TTI) in an orthogonal frequency-division multiplexing (OFDM) or an orthogonal frequency division multiple access (OFDMA)-based communication system. As an example in which the services have different numerologies, the eMBMS 408 may have a longer CP than other services. Since the eMBMS transmits higher traffic based on broadcasting, the same data may be transmitted in all cells.

Here, if the signals, received by a plurality of cells, are the same as or shorter than the CP length, the UE may receive and decode all of the signals and thus obtain a single frequency network (SFN) diversity gain, and accordingly, even a UE located at a cell boundary can receive broadcasting information without any coverage restriction. However, in the case where the CP length is relatively longer than other services, in order to support the eMBMS in 5G, waste occurs due to CP overhead, and thus a longer OFDM symbol is required than in the case of other services, which results in narrower subcarrier spacing compared to other services.

Further, as an example in which different numerologies are used for services in 5G, in the case of URLLC, a shorter OFDM symbol may be required as a shorter TTI is required compared to other services, and moreover, wider subcarrier spacing may be required.

On the other hand, one TTI may be defined as one slot and configured by 14 OFDM symbols or 7 OFDM symbols in 5G. Accordingly, in the case of subcarrier spacing of 15 kHz, one slot has a length of 1 ms or 0.5 ms. In 5G, one TTI may be defined as one mini-slot or sub-slot for emergency transmission and transmission in an unlicensed band, and one mini-slot may have OFDM symbols ranging from 1 to (the total number of OFDM symbols of the slot)-1. If the length of one slot corresponds to 14 OFDM symbols, the length of the mini-slot may be determined as one of 1 to 13 OFDM symbols. The length, format, or repetition form of the slot or the mini-slot may be defined according to a standard, or may be transmitted by a higher-layer signal, system information, or a physical signal, and received by the UE. In addition, instead of a mini-slot or sub-slot, the length of the slot may be determined as one of 1 to 14 OFDM symbols, and the length of the slot may be transmitted through a higher-layer signal or system information and received by the terminal.

The slot or the mini-slot may be defined to have various transmission formats, and may be classified into the following formats.

DL-only slot or full-DL slot: the DL-only slot includes only a downlink period and supports only downlink transmission.

DL-centric slot: the DL-centric slot includes a downlink period, a GP (or flexible symbol), and an uplink period, wherein the number of OFDM symbols in the downlink period is larger than the number of OFDM symbols in the uplink period.

UL-centric slot: the UL-centric slot includes a downlink period, a GP (or flexible symbol), and an uplink period, wherein the number of OFDM symbols in the downlink period is smaller than the number of OFDM symbols in the uplink period.

UL-only slot or full-UL slot: the UL-only slot includes only an uplink period and supports only uplink transmission.

In the above, only the slot formats have been classified, but the mini-slot may also be classified through the same classification method. For example, the mini-slot may be classified into a DL-only mini-slot, a DL-centric mini-slot, a UL-centric mini-slot, and a UL-only mini-slot. In the above, the flexible symbol may be used as a guard symbol for transmission or reception switching, and may also be used for the purpose of channel estimation.

Hereinafter, although the following detailed description of the embodiments will be directed to LTE and 5G, it can be understood by those skilled in the art that the main gist of the disclosure may also be applied to other communication systems having similar technical backgrounds and channel formats, with slight modification, without substantially departing from the scope of the disclosure.

In order to stably support the mobility of the terminal of the existing mobile communication system while satisfying the requirements of the ultra-high speed data service and the ultra-low-latency service of the above-mentioned 5G system, it is necessary to configure an integrated system that combines a beamforming technology operating in the ultra-high frequency band, a new radio access technology (New RAT) applying a short TTI, and an LTE/LTE-A system operating in a relatively-low frequency band. In this case, the new radio access technology serves to satisfy the requirements of the 5G system, and the LTE/LTE-A system serves to stably support the mobility of the terminal FIG. 5 illustrates a configuration of a communication system to which the disclosure is applied according to an embodiment of the disclosure.

Figure 5:
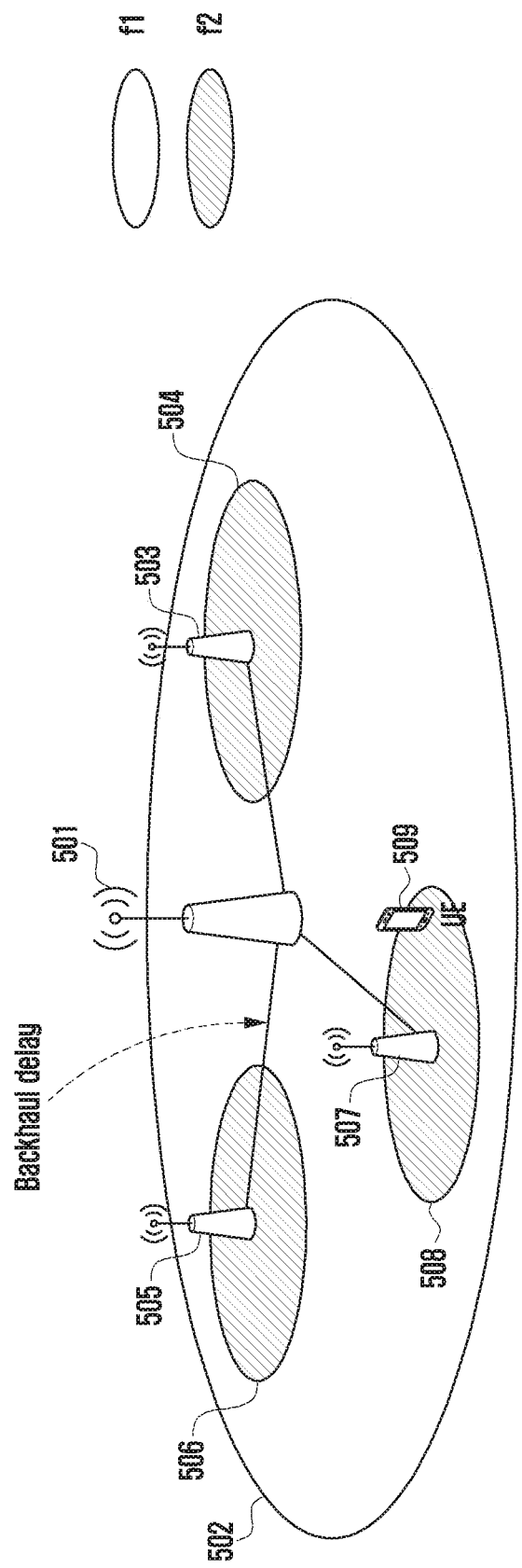
FIG. 5 illustrates a communication system configuration to which the disclosure is applied according to an embodiment of the disclosure.

Referring to FIG. 5, an example of a configuration of an integrated system obtained by combining a base station, which is associated with the new radio access technology, with an LTE/LTE-A base station is illustrated.

Referring to FIG. 5, small base stations 503, 505, and 507 having relatively small coverage areas 504, 506, and 508 may be disposed in the coverage area 502 of a macro base station 501. In general, the macro base station 501 may transmit signals with relatively higher transmission power than that of the small base stations 503, 505, and 507, so that the coverage area 502 of the macro base station 501 is relatively larger than the coverage areas 504, 506, and 508 of the small base stations 503, 505, and 507. In the example of FIG. 5, the macro base station indicates an LTE/LTE-A system operating in a relatively low frequency band, and the small base stations 503, 505, and 507 indicate a system applying a new radio access technology (NR or 5G) operating in a relatively high frequency band.

The macro base station 501 and the small base stations 503, 505, and 507 are interconnected, and a certain degree of backhaul delay may exist therebetween depending on the connection state. Therefore, it may not be desirable to exchange information, which is sensitive to transmission delay, between the macro base station 501 and the small base stations 503, 505, and 507.

Meanwhile, FIG. 5 exemplarily illustrates carrier aggregation between the macro base station 501 and the small base stations 503, 505, and 507, but the disclosure is not limited thereto and may be applicable to carrier aggregation between base stations located at different geographical locations. For example, according to an embodiment of the disclosure, the disclosure is also applicable to carrier aggregation between macro base stations located at different locations, or to carrier aggregation between small base stations located at different locations. In addition, the number of aggregated carriers is not limited. Alternatively, the disclosure is also applicable to carrier aggregation in the macro base station 501 and carrier aggregation in the small base stations 503, 505, and 507.

Referring to FIG. 5, the macro base station 501 may use frequency f1 for downlink signal transmission, and the small base stations 503, 505, and 507 may use frequency f2 for downlink signal transmission. At this time, the macro base station 501 may transmit data or control information to a predetermined UE 509 through frequency f1, and the small base stations 503, 505, and 507 may transmit data or control information through frequency f2. Through the carrier aggregation described above, a base station that implements a new radio access technology capable of supporting an ultra-wide band in a high frequency band, may provide ultra-high-speed data service and ultra-low delay service, and a base station that implements LTE/LTE-A technology in a relatively low-frequency band may support stable mobility of a UE.

Meanwhile, the configuration illustrated in FIG. 5 is applicable not only to downlink carrier aggregation but also to uplink carrier aggregation. For example, the UE 509 may transmit data or control information to the macro base station 501 through frequency f1' for uplink signal transmission. In addition, the UE 509 may transmit data or control information to the small base stations 503, 505, and 507 through frequency f2' for uplink signal transmission. The f1' may correspond to f1, and the f2' may correspond to f2. The uplink signal transmission, by the UE, to the macro base station and the small base station may be performed at different time points, or may be performed simultaneously. In either case, due to the physical limitations of the power amplifier element of the UE and radio wave regulation pertaining to the UE transmission power, the total sum of uplink transmission power of the UE at a certain instant needs to be maintained within a predetermined threshold.

In the environment illustrated in FIG. 5, the operation of the UE 509, which accesses the macro base station 501 and the small base stations 503, 505, and 507 to perform communication, is referred to as dual connectivity (DC). If the UE performs dual connectivity, the following two configuration methods are possible.

First, a UE performs an initial connection to the macro base station 501 operating as an LTE/LTE-A system, and then receives, via a higher-layer signal (system or RRC signal), configuration information for data transmission and reception to or from the macro base station. Thereafter, the UE receives, from a higher-layer signal (system or RRC signal) of the macro base station 501, configuration information for data transmission and reception to or from the small base stations 503, 504, and 505 operating as an NR system, and performs random access to the small base stations 503, 504, and 505) so that the UE enters a dual connectivity state in which data transmission and reception is possible to or from the macro base station 501 and the small base station 503, 504, and 505. At this time, the macro base station 501 operating as an LTE/LTE-A system is referred to as a master cell group (MCG), and the small base stations 503, 504, and 505, operating as an NR system, are referred to as a secondary cell group (SCG). The state where the UE is in the dual connectivity state may be exemplified by the case where the UE is configured as an MCG using E-UTRA radio access (or LTE/LTE-A) and an SCG using NR radio access. Alternatively, it may be exemplified by the case where the UE is configured for E-UTRA NR dual connectivity (EN-DC).

Second, the UE performs initial connection to the small base stations 503, 504, and 505 operating as an NR system, and then receives, from a higher-layer signal (system or RRC signal), configuration information for data transmission and reception to or from the small base stations. Thereafter, the UE receives, from a higher-layer signal (system or RRC signal) of the small base station 503, 504, and 505, configuration information for data transmission and reception to or from the macro base station 501 operating as an LTE/LTE-A system, and performs random access to the macro base station 501 so that the UE enters a dual connectivity state in which data transmission and reception is possible to or from the small base station 503, 504, and 505 and the macro base station 501. At this time, the small base stations 503, 504, and 505 operating as an NR system are referred to as an MCG, and the macro base station 501 operating as an LTE system is referred to as an SCG. The state where the UE is in the dual connectivity state may be exemplified by the case where the UE is configured as an MCG using NR radio access and an SCG using E-UTRA radio access (or LTE/LTE-A). Alternatively, it may be exemplified by the case where the UE is configured for NR E-UTRA dual connectivity (NE-DC).

Hereinafter, embodiments described in the disclosure will be proposed based on the first dual connectivity configuration method and the second dual connectivity configuration method. For example, the disclosure proposes another embodiment according to whether LTE cells using E-UTRA correspond to an MCG or whether NR cells using NR correspond to an MCG. If the UE is in a dual connectivity state, since importance is given to uplink transmission to the MCG rather than to uplink transmission to the SCG, another embodiment is proposed according to whether the LTE cells using E-UTRA are the MCG or whether the NR cell using NR are the MCG. In addition, since timing for performing uplink transmission to a cell using NR, for example, PDCCH-to-PUSCH transmission timing or PDCCH-to-PUCCH transmission timing, may be indicated differently by a higher-layer signal configuration and an instruction from the PDCCH, and timing for performing uplink transmission to a cell using LTE (e.g., PDCCH-to-PUSCH transmission timing or PDCCH-to-PUCCH transmission timing) is fixed, embodiments are to be proposed based on these conditions.

In the case where the UE is configured for E-UTRA NR dual connectivity (EN-DC), the power distribution method will be described first. For example, in the case where the UE is configured to be an MCG using E-UTRA radio access and is configured to an SCG using NR radio access, the UE receives, from the LTE base station or the NR base station, the configuration for the maximum power value of the uplink for LTE and the maximum power value of the uplink for NR. In addition, the UE receives the configuration for the maximum power value for the EN-DC operation from the LTE base station or the NR base station. In this case, if the sum of the maximum power value of the uplink for LTE and the maximum power value of the uplink for NR is greater than the maximum power value for the EN-DC operation, the UE applies one of the following two power distribution methods.

First, proposed is semi-static power sharing between the MCG (LTE) and the SCG (NR). In the case where the UE receives a reference TDD configuration that restricts LTE uplink transmission only in a specific subframe in order to perform uplink transmission of LTE, if the UE does not provide an indication of or report the ability to perform dynamic power sharing to a base station, the UE does not expect uplink transmission in a slot of the NR that coincides with the time interval in which LTE uplink transmission is performed in an uplink subframe, according to the reference TDD configuration (or the UE does not expect configuration or scheduling indicating NR uplink transmission from an NR base station).

Second, proposed is dynamic power sharing between the MCG (LTE) and the SCG (NR). If the UE provides an indication of or reports the ability to perform dynamic power sharing to the base station, and if LTE uplink transmission and NR uplink transmission of the UE collide and the sum of the power of the LTE uplink transmission and power of the NR uplink transmission is greater than the maximum power value for the EN-DC operation, the UE reduces the NR uplink transmission power so that the sum of the power of the LTE uplink transmission and the power of the NR uplink transmission is smaller than the maximum power value for the EN-DC operation. In the case of reducing the NR uplink transmission power, if the transmission power to be reduced is greater than X, the UE may drop NR transmission. If the transmission power to be reduced is less than X, the UE performs NR uplink transmission using the reduced transmission power.

Figure 6:
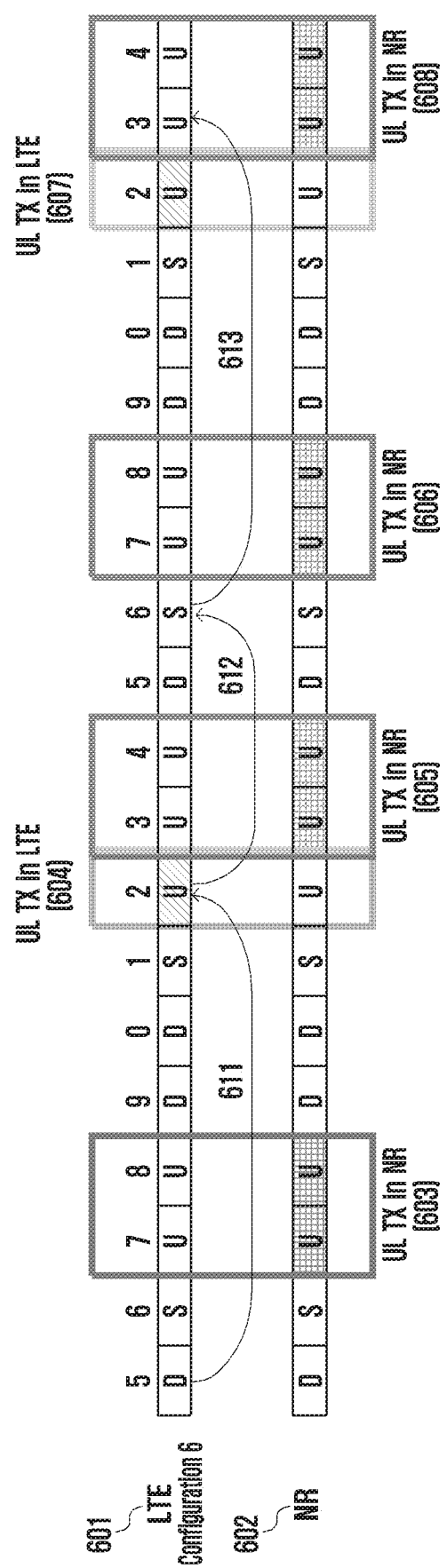
FIG. 6 illustrates an NR uplink transmission and an LTE uplink transmission according to an embodiment of the disclosure.

FIG. 6 illustrates a proper NR uplink transmission and an LTE uplink transmission according to an embodiment of the disclosure.

Referring to FIG. 6, LTE 601 is an MCG and is operated in a TDD mode, and NR 602 is an SCG. Therefore, FIG. 6 may be applied if a UE is configured for EN-DC. In FIG. 6, the TDD cell of LTE 601 corresponds to TDD UL-DL configuration #6 (FIG. 6 describes the TDD UL-DL configuration #6 situation by way of example, but without limitation), and the EN-DC UE may receive TDD UL-DL configuration #6 from the system information and may identify the locations of an uplink subframe, a special subframe, and a downlink subframe. Information about the locations or numbers of uplink, downlink, or flexible slots of the NR 602 and the OFDM symbol thereof may be received, by the EN-DC UE, from system information, higher-level information, or a physical-layer signal.

FIG. 6 will be described based on the situation in which the EN-DC UE operates in a semi-static power distribution mode between the LTE 601 and the NR 602. For example, FIG. 6 is based on a situation where the EN-DC UE receives a configuration for reference TDD configuration #5 among reference TDD configurations (#2, #4, #5) capable of limiting LTE uplink transmission only in a specific subframe in order to perform uplink transmission of LTE, and the EN-DC UE does not provide an indication of or report the ability to perform dynamic power distribution to the LTE or NR base station. At this time, the EN-DC UE may identify that LTE uplink transmission is possible only in uplink subframe #2, which matches the uplink subframe according to reference TDD configuration #5 among uplink subframes #2, #3, #4, #7, and #8 of TDD UL-DL configuration #6 of LTE 601, received via system information (indicated by reference numerals 604 and 607), and that NR uplink transmission is possible in a slot of NR that matches the time interval of the remaining uplink subframes #3, #4, #7, and #8 (indicated by reference numerals 603, 605, 606, and 608) (see Table 3 and Table 4).

If the EN-DC UE follows a UL HARQ timing relationship between PDCCH transmission and PUSCH transmission (see Table 6 and Table 7), defined in TDD UL-DL configuration #6, and TDD UL-DL configuration given from system information of LTE 601 with respect to uplink data transmission, the EN-DC UE performs PUSCH transmission in uplink subframe #2 by scheduling the PDCCH received from the LTE base station in downlink subframe #5 of the LTE 601 (indicated by reference numeral 611), ACK/NACK for the PUSCH or PDCCH is received from the LTE base station in special subframe #6 (indicated by reference numeral 612), and in response thereto the retransmitted PUSCH is transmitted in uplink subframe #3 (indicated by reference numeral 613). Since the time interval corresponding to the uplink subframe #3 is an interval in which only NR uplink transmission is possible, if the PUSCH retransmission of the EN-DC UE occurs, an issue of collision of the NR uplink transmission and the LTE uplink transmission occurs. Therefore, the disclosure provides a method for addressing the above issues through Embodiments 1 and 2.

Next, in connection with FIG. 6, another issue of concern will be described based on the situation in which the EN-DC UE operates in a dynamic power distribution mode between LTE 601 and NR 602. For example, if the EN-DC UE provides an indication of or reports the ability to perform the dynamic power distribution to the base station, with respect to the case where, in a time interval of uplink subframe #2, which is limited to perform uplink transmission of LTE according to the reference TDD configuration, the LTE uplink transmission and the NR uplink transmission of the UE collide, as indicated by reference numeral 608 of FIG. 6, or the sum of the power of the LTE uplink transmission and the power of the NR uplink transmission is greater than the maximum power value for the EN-DC operation, the EN-DC UE provides a method for addressing the issue through Embodiment 3. In addition, in uplink subframes #3, #4, #7, and #8, which are time intervals other than uplink subframe #2, limited to perform uplink transmission of LTE according to the reference TDD configuration, if the LTE uplink transmission and NR uplink transmission of the UE collide, as indicated by reference numeral 608 of FIG. 6, or if the sum of the power of the LTE uplink transmission and the power of the NR uplink transmission is greater than the maximum power value for the EN-DC operation, the EN-DC UE provides a method for addressing the above issue through Embodiment 4.

Embodiment 1

Figure 7:
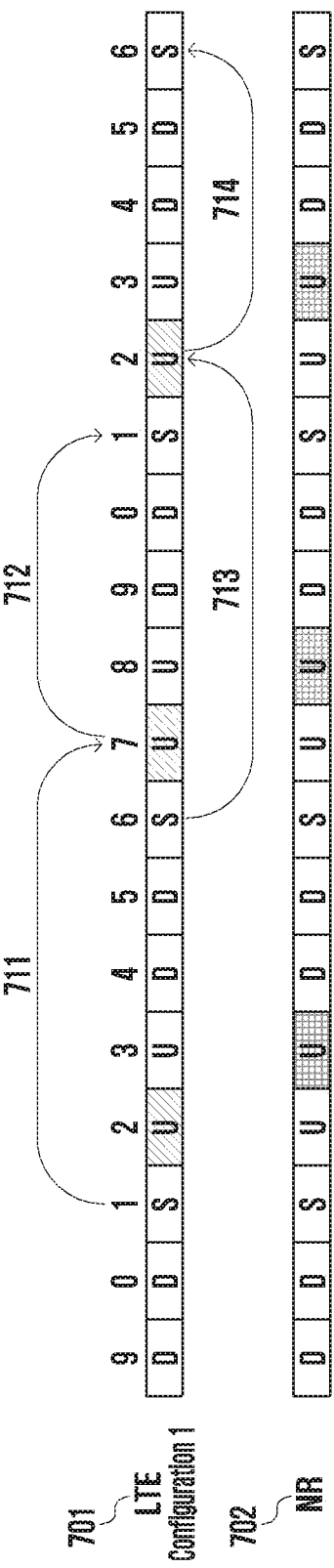
FIG. 7 illustrates an uplink transmission according to Embodiment 1 according to an embodiment of the disclosure.

FIG. 7 illustrates an uplink transmission according to an embodiment of the disclosure.

Referring to FIG. 7, LTE 701 is an MCG and is operated in a TDD mode, and NR 702 is an SCG. Therefore, FIG. 7 may be applied if the UE is configured for EN-DC. In FIG. 7, the TDD cell of LTE 701 corresponds to TDD UL-DL configuration #1, and the EN-DC UE receives TDD UL-DL configuration #1 from system information, so as to identify the locations of an uplink subframe, a special subframe, and a downlink subframe. Information about the locations or the numbers of the uplink, downlink, or flexible slots of the NR 702 and OFDM symbols thereof may be received by the EN-DC UE from system information, higher-level information or a physical-layer signal. FIG. 7 is based on a situation where the EN-DC UE is operating in a semi-static power distribution mode between LTE 701 and NR 702. For example, the situation may be assumed in which the EN-DC UE receives configuration for reference TDD configuration #2 among reference TDD configurations (#2, #4, #5) capable of limiting LTE uplink transmission only in a specific subframe in order to perform uplink transmission of LTE, and the EN-DC UE does not provide an indication of or report the ability to perform dynamic power distribution to the LTE or NR base station. At this time, the EN-DC UE may identify that LTE uplink transmission is possible only in uplink subframes #2 and #7, which match the uplink subframe according to reference TDD configuration #2, among uplink subframes #2, #3, #7, and #8 of TDD UL-DL configuration #1 of LTE 701, received via system information, and that NR uplink transmission is possible in a slot of NR that matches the time interval of the remaining uplink subframes #3 and #8 (see Table 3 and Table 4).

As described above, if the TDD UL-DL configuration, received from the LTE base station of LTE 701, is one of TDD UL-DL configurations #1, #2, #3, #4, and #5 other than TDD UL-DL configurations #0 and #6, and if the reference TDD configuration, which is received via a higher-layer signal from the LTE base station or the NR base station, is one of #2, #4, and #5, the embodiment proposes that the EN-DC UE follows a UL HARQ timing relationship between PDCCH transmission and PUSCH transmission, defined in TDD UL-DL configuration #1 in FIG. 7, and TDD UL-DL configuration given from system information of LTE 701 with respect to uplink data transmission (see Table 6 and Table 7). In this case, since the EN-DC UE receives uplink subframes according to PDCCH reception, PUSCH transmission, and PUSCH retransmission, in which the uplink subframes are generated in the same LTE uplink subframe for every radio frame (indicated by reference numerals 711, 712, 713, and 714), if PUSCH retransmission of the EN-DC UE occurs, the NR uplink transmission and the LTE uplink transmission collision may not occur.

Embodiment 2

Figure 8:
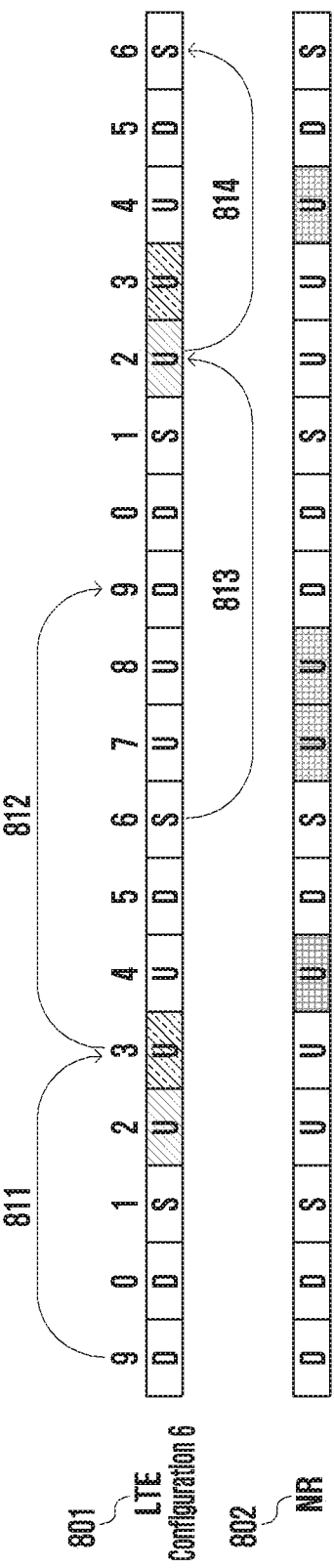
FIG. 8 illustrates an uplink transmission according to Embodiment 2 according to an embodiment of the disclosure.

FIG. 8 illustrates an uplink transmission according to an embodiment of the disclosure.

Referring to FIG. 8, LTE 801 is an MCG and is operated in a TDD mode, and NR 802 is an SCG. Therefore, FIG. 8 may be applied if the UE is configured for EN-DC. In FIG. 8, the TDD cell of LTE 801 corresponds to TDD UL-DL configuration #6, and the EN-DC terminal may receive TDD UL-DL configuration #6 from system information so as to identify the locations of an uplink subframe, a special subframe, and a downlink sub-frame. Information about the locations or numbers of uplink, downlink, or flexible slots of the NR 802 and OFDM symbols thereof may be received, by the EN-DC UE, from system information, higher-level information, or a physical-layer signal. FIG. 8 considers the situation in which the EN-DC UE operates in a semi-static power distribution mode between LTE 801 and NR 802. For example, FIG. 8 is based on a situation where the EN-DC UE receives reference TDD configuration #4, among reference TDD configurations #2, #4, and #5 capable of limiting the LTE uplink transmission only to a specific subframe in order to perform uplink transmission of LTE, and the EN-DC UE does not provide an indication of or report the ability to perform dynamic power distribution to the LTE or NR base station. At this time, the EN-DC UE may identify that LTE uplink transmission is possible only in uplink subframes #2 and #3, which match an uplink subframe according to reference TDD configuration #4, among uplink subframes #2, #3, #4, #7, and #8 of TDD UL-DL configuration #6 of LTE 801, received via system information, and that NR uplink transmission is possible in a slot of NR that matches the time intervals of the remaining uplink subframes #4, #7, and #8 (see Table 3 and Table 4).

As described above, if the TDD UL-DL configuration received from the LTE base station of LTE 801 is one of TDD UL-DL configurations #0 and #6, and the reference TDD configuration, received via a higher-layer signal from the LTE base station or the NR base station, is one of configurations #2, #4, and #5, the embodiment proposes that the EN-DC UE follows the UL HARQ timing relationship between PDCCH transmission and PUSCH transmission, defined according to another specific second reference TDD configuration rather than the TDD UL-DL configuration given from the system information of LTE 801 with respect to uplink data transmission (see Table 6 and Table 7). In this case, since the EN-DC UE receives uplink subframes according to PDCCH reception, PUSCH transmission, and PUSCH retransmission, in which the uplink subframes are generated in the same LTE uplink subframe for every radio frame (indicated by reference numerals 811, 812, 813, and 814), if the PUSCH retransmission of the EN-DC UE occurs, the NR uplink transmission and the LTE uplink transmission collision may not occur.

The second reference TDD configuration for defining the UL HARQ timing relationship may be proposed as follows.

If the UL-DL configuration from the system information corresponds to #6 and the reference TDD configuration is one of #2, #4, and #5, the second reference TDD configuration for UL HARQ timing corresponds to #1.

If the UL-DL configuration from system information corresponds to #0 and the reference TDD configuration is one of #2 and #5, the second reference TDD configuration for UL HARQ timing corresponds to #1.

If the UL-DL configuration from the system information corresponds to #0 and the reference TDD configuration corresponds to #4, if second reference TDD configuration #1 for UL HARQ timing is followed, the PDCCH for scheduling the PUSCH of uplink subframe #3 needs to be transmitted in downlink subframe #9 of a previous radio frame. However, in UL-DL configuration #0, since subframe #9 is an uplink subframe, an issue in which the PDCCH cannot be transmitted occurs.

Therefore, if the UL-DL configuration from the system information corresponds to #0 and the reference TDD configuration corresponds to #4, the following proposal is possible.

First, the second reference TDD configuration for UL HARQ timing corresponds to #1, but the EN-DC UE does not expect scheduling of the PUSCH in UL subframe #3 of LTE.

Second, the second reference TDD configuration for UL HARQ timing in UL subframe #2 corresponds to #1, but the EN-DC UE expects that the PDCCH for scheduling the PUSCH in UL subframe #3 is transmitted from downlink subframe #5 of the previous radio frame.

Third, if the UL-DL configuration from the system information corresponds to #0, the EN-DC UE does not expect that the reference TDD configuration corresponds to #4. For example, the UE expects only the case where the reference TDD configuration is configured to be #2 or #5.

Unlike the above proposals, it is also possible for the EN-DC UE not to expect the UL-DL configuration from system information to be #0 or #6 from the beginning For example, the EN-DC UE does not expect the same configuration as in the second embodiment of the disclosure, and receives only one of TDD UL-DL configurations #1, #2, #3, #4, #5 from the system information. The reference TDD configuration may receive one of #2, #4, and #5 from a higher-layer signal, and the second reference TDD configuration for UL HARQ timing may be defined in the specification as #1.

Embodiment 3

In FIG. 6, if the EN-DC UE provides an indication of or reports the ability to perform the dynamic power distribution to the base station based on the situation in which the EN-DC UE operates in a dynamic power distribution mode between LTE 601 and NR 602, the disclosure provides a method in which the EN-DC UE address the issue through Embodiment 3 with respect to the case where, in a time interval of the uplink subframe #2, which is limited to perform uplink transmission of LTE according to the reference TDD configuration, the LTE uplink transmission and the NR uplink transmission of the UE collide as indicated by reference numeral 608 in FIG. 6, or the sum of the power of the LTE uplink transmission and the power of the NR uplink transmission is greater than the maximum power value for the EN-DC operation according to an embodiment of the disclosure.

According to a first method, the EN-DC UE performs only LTE uplink transmission and always drops NR uplink transmission. As described above, it is possible to protect the uplink transmission of LTE serving as the MCG and maintain the connection with the MCG, and to transmit or receive important information necessary for RRC connection to or from the MCG.

According to a second method, the EN-DC UE maintains the power of LTE uplink transmission, and reduces the power of NR uplink transmission so that the sum of the power of LTE uplink transmission and the power of NR uplink transmission is equal to or smaller than the maximum power value for the configured EN-DC operation. By protecting the uplink transmission of LTE serving as the MCG according to the method described above, it is possible to maintain the connection with the MCG, transmit or receive important information necessary for RRC connection to or from the MCG, and simultaneously perform NR uplink transmission within the maximum power of EN-DC.

Embodiment 4

Referring to FIG. 6, if the EN-DC UE provides an indication of or reports the ability to perform the dynamic power distribution to the base station based on the situation in which the EN-DC UE operates in a dynamic power distribution mode between LTE 601 and NR 602, the disclosure provides a method in which the EN-DC UE addresses the issue through Embodiment 4 with respect to the case where, in uplink subframes #3, #4, #7, and #8 other than uplink subframe #2, which is limited to perform uplink transmission of LTE according to the reference TDD configuration, the LTE uplink transmission and the NR uplink transmission of the UE collide as indicated by reference numeral 608 of FIG. 6, or the sum of the power of the LTE uplink transmission and the power of the NR uplink transmission is greater than the maximum power value for the EN-DC operation.

According to a first method, the EN-DC UE performs only LTE uplink transmission and always drops NR uplink transmission. As described above, in an uplink subframe corresponding to a time interval other than uplink subframe #2, which is limited to perform uplink transmission of LTE according to the reference TDD configuration, it is possible to protect the uplink transmission of LTE, serving as the MCG, and maintain the connection with the MCG, and to transmit or receive important information necessary for RRC connection to or from the MCG.

According to a second method, the EN-DC UE maintains the power of LTE uplink transmission and reduces the power of NR uplink transmission so that the sum of the power of LTE uplink transmission and the power of NR uplink transmission is equal to or smaller than the maximum power value for the configured EN-DC operation. According to the method described above, the uplink transmission of the LTE serving as the MCG is protected even in the uplink subframe corresponding to a time interval other than uplink subframe #2, which is limited to uplink transmission of the LTE according to the reference TDD configuration in the above method, and it is possible to maintain the connection with the MCG, transmit or receive important information necessary for RRC connection to or from the MCG, and simultaneously perform NR uplink transmission within EN-DC maximum power, so as to increase the data transmission/reception throughput of the UE.

According to a third method, the EN-DC UE performs only NR uplink transmission and always drops LTE uplink transmission. According to the method, in the uplink subframes corresponding to the time interval other than the uplink subframe #2, which is limited to uplink transmission of LTE according to the reference TDD configuration, the uplink transmission of the NR serving as the SCG is possible rather than the uplink transmission of the LTE serving as the MCG, so that the amount of data transmission/reception using NR can be increased, and thus the data transmission/reception throughput of the EN-DC UE can be increased.

According to another method, it is possible to combine the above three methods and apply the resultant combination to the EN-DC UE. For example, it is possible to apply the first method to specific LTE uplink channel transmission or to a specific LTE uplink transmission signal, such as in the case where the LTE uplink transmission corresponds to an important uplink transmission for RRC connection, such as physical random access channel (PRACH) transmission. If the LTE uplink transmission does not correspond to the specific LTE uplink transmission or the specific LTE uplink transmission signal, it is possible to apply a second or third method thereto. Alternatively, a third method is applied to a specific NR uplink channel transmission or a specific NR uplink transmission signal, such as in the case where the NR uplink transmission is an important uplink transmission, such as PRACH transmission, and if the NR uplink transmission does not correspond to the specific NR uplink transmission or a specific NR uplink transmission signal, it is possible to apply the first or second method thereto.

Figure 9A:
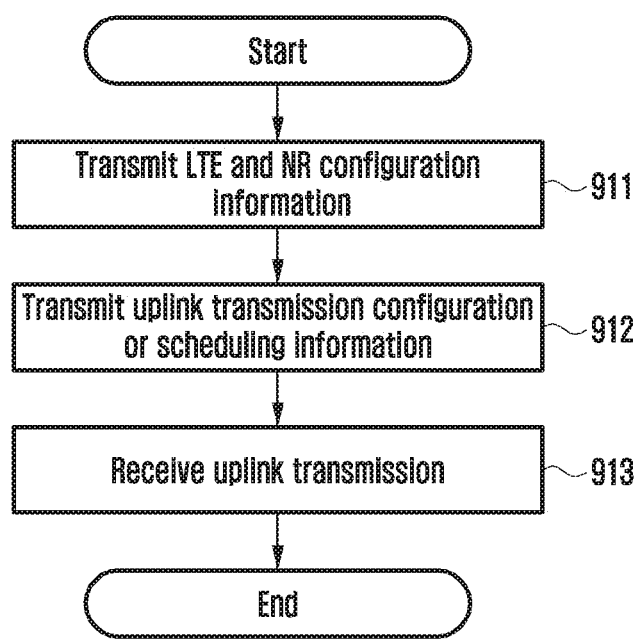
FIG. 9A illustrates a base station procedure according to an embodiment of the disclosure.
Figure 9B:
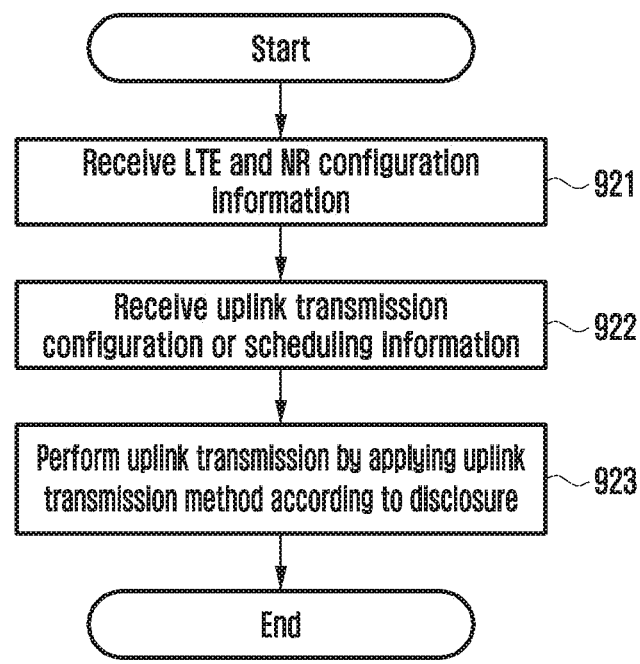
FIG. 9B illustrates a user equipment (UE) procedure according to various embodiments of the disclosure.

FIG. 9A illustrates a base station procedure, and FIG. 9B illustrates a UE procedure according to various embodiments of the disclosure.

First, a base station procedure will be described.

Referring to FIGS. 9A and 9B, in operation 911, a base station transmits configuration information of respective cells to a UE through system information or a higher-layer signal. The configuration information may be cell-related information of MCG or SCG cells required for dual connectivity (at least one of TDD or FDD information, uplink and downlink carrier frequencies, uplink and downlink frequency bands, and uplink and downlink subcarrier spacing), and may be configuration information required for data transmission and reception in the MCG or SCG. Alternatively, the configuration information may include at least one of configuration information related to various parameters described in the embodiments. The base station may be an NR base station using NR radio access or an E-UTRA base station using E-UTRA radio access.

In operation 912, the base station configures uplink transmission for the UE according to embodiments proposed in the disclosure, and transmits scheduling information indicating uplink transmission. The base station may be an NR base station using NR radio access or an E-UTRA base station using E-UTRA radio access. The uplink transmission configuration may refer to uplink transmission, which is not indicated by the PDCCH but is configured in a higher-layer signal configuration, such as periodic channel information transmission, and the uplink transmission indicated by the scheduling information may denote uplink transmission, which is indicated by the PDCCH and transmitted from the UE, such as PUSCH transmission or HARQ-ACK transmission, Alternatively, the uplink transmission may be uplink transmission from a UE, such as PRACH or SRS.

In operation 913, the base station receives uplink transmission from the UE according to the embodiments proposed in the disclosure. The base station may be an NR base station using NR radio access or an E-UTRA base station using E-UTRA radio access.

Next, the UE procedure will be described.

In operation 921, the UE receives configuration information of respective cells from the base station through system information or a higher-layer signal. The configuration information may be cell-related information of MCG or SCG cells required for dual connectivity (at least one of TDD or FDD information, uplink and downlink carrier frequencies, uplink and downlink frequency bands, and uplink and downlink subcarrier spacing), and may be configuration information required for data transmission or reception in the MCG or SCG. Alternatively, the configuration information may include at least one of configuration information related to various parameters described in the embodiments. As described in the embodiments of the disclosure, before receiving the dynamic power-sharing capability via a higher-layer signal from the base station, the UE may transmit the capability-related information to the base station. The base station may be an NR base station using NR radio access or an E-UTRA base station using E-UTRA radio access.

In operation 922, the UE receives uplink transmission configuration information from the base station according to embodiments proposed in the disclosure, and receives scheduling information indicating uplink transmission. The base station may be an NR base station using NR radio access or an E-UTRA base station using E-UTRA radio access. The uplink transmission configuration information may denote configuration information related to uplink transmission, which is not indicated by the PDCCH but is configured in a higher-layer signal configuration, such as periodic channel information transmission, and the uplink transmission indicated by the scheduling information may denote uplink transmission, which is indicated by the PDCCH and transmitted from the UE, such as PUSCH transmission or HARQ-ACK transmission. Alternatively, the uplink transmission may be uplink transmission transmitted from a UE, such as PRACH or SRS.

In operation 923, the UE controls transmission timing and transmission power using the UL HARQ timing relationship (PDCCH-to-PUSCH transmission, PUSCH-to-PDCCH transmission, or the like) according to the embodiments proposed in the disclosure, and transmits the uplink transmission to the base station. The controlling of the transmission power may include an operation of dropping uplink transmission or reducing uplink transmission power as described in the embodiments. The base station may be an NR base station using NR radio access or an E-UTRA base station using E-UTRA radio access.

Figure 10:
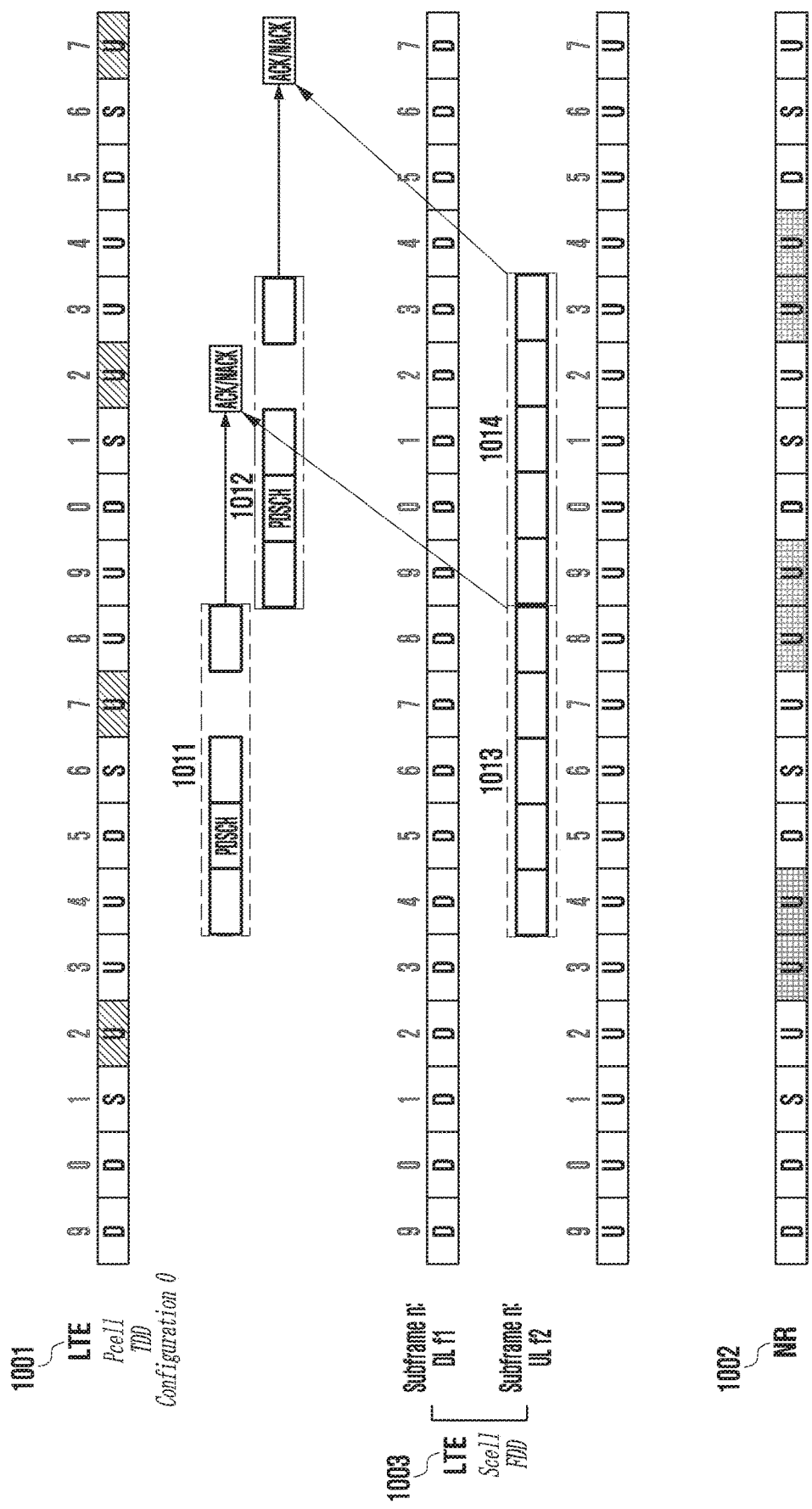
FIG. 10 illustrates addressing an issue of concern where an evolved universal mobile telecommunications system (UMTS) terrestrial radio access (EUTRA) new radio (NR)—dual connectivity (EN-DC) UE transmits or receives data to or from base stations described in FIG. 5 through a cell having a certain configuration according to an embodiment of the disclosure.

FIG. 10 illustrates addressing an issue of concern where the EN-DC UE transmits or receives data to or from base stations described in FIG. 5 through a cell having a certain configuration according to an embodiment of the disclosure.

FIG. 10 is based on a situation where LTE cells correspond to an MCG, and may be configured for an EN-DC UE through carrier aggregation (CA) of two cells or a case where only one cell is configured for the EN-DC UE without carrier aggregation, for only a primary cell (PCell) as described below. FIG. 10 is based on a situation where NR cells correspond to an SCG and are configured for the EN-DC UE using one cell 1002 according to an embodiment of the disclosure. The disclosure is described under the assumption that a PCell 1001, which is the first LTE cell of MCG, is operated as a TDD cell and corresponds to TDD UL-DL configuration #0, and that a secondary cell (S Cell) 1003, which is the second LTE cell of the MCG, is operated as an FDD cell. In FIG. 10, the SCell 1003 is an FDD cell, but may be operated according to TDD UL-DL configuration #0, such as a TDD cell, especially the PCell 1001, or the SCell may be operated according to another TDD UL-DL configuration in the disclosure. For example, the TDD configuration or the FDD configuration of the SCell 1003 is not limited to the configuration illustrated in FIG. 10, and other configurations may be applied in the same manner.

Referring to FIG. 10, the EN-DC UE may receive TDD UL-DL configuration #0 of the PCell 1001 from system information, so as to identify the locations of an uplink subframe, a special subframe, and a downlink subframe, and may receive TDD UL-DL configuration #0 of the PCell 1001 from a higher-layer signal so as to identify carrier information and bandwidth information of the SCell 1003. Information about the locations or numbers of uplink, downlink, or flexible slots of the NR cell 1002 and OFDM symbols thereof may be received, by the EN-DC UE, from system information, higher-level information, or a physical-layer signal. FIG. 10 considers a situation where the EN-DC UE operates in a semi-static power distribution mode between LTE and NR. For example, FIG. 10 is based on a situation where the EN-DC UE receives reference TDD configurations #2 via a higher-layer signal, among reference TDD configurations #2, #4, and #5 capable of limiting LTE uplink transmission only in a specific subframe in order to perform uplink transmission of LTE, or where the EN-DC UE does not provide an indication of or report the ability to perform dynamic power sharing to the LTE or NR base station. At this time, the EN-DC UE may identify that LTE uplink transmission is possible only in uplink subframes #2 and #7, which match uplink subframe according to reference TDD configuration #2, among uplink subframes #2, #3, #4, #7, #8, and #9 of TDD UL-DL configuration #0 of the PCell 1001, received via system information, and that NR uplink transmission is possible in a slot of NR that matches the time intervals of the remaining uplink subframes #3, #4, #8, and #9. Accordingly, the EN-DC UE may transmit HARQ ACK/NACK for downlink data transmitted from the PCell 1001, based on the timing relationship in UL-DL configuration #2 of Table 3 and Table 4, corresponding to reference TDD configuration value #2. For example, if downlink data is received from subframes #4, #5, #8, and #6 of the PCell 1001, the EN-DC UE transmits HARQ ACK/NACK feedback for the downlink data in subframe #2 of the PCell 1001 (indicated by reference numeral 1011), and if downlink data is received from subframes #9, #0, #3, and #1, the EN-DC UE transmits HARQ ACK/NACK feedback for downlink data in subframe #7 of the PCell 1001 (indicated by reference numeral 1012).

Since HARQ ACK/NACK for the downlink data reception of the LTE SCell 1003 needs to be transmitted from the PCell 1001, which is a primary cell, the HARQ ACK/NACK transmission is also possible only in a specific LTE subframe of the PCell 1001. For example, the EN-DC UE may identify that LTE uplink transmission is possible only in uplink subframes #2 and #7, which match the uplink subframe according to reference TDD configuration #2, and that NR uplink transmission is only possible in a slot of the NR that matches the time intervals of the remaining uplink subframes #3, #4, #8, and #9.

Accordingly, HARQ ACK/NACK for downlink data transmitted from the LTE SCell 1003 is transmitted based on the timing relationship in the DL reference UL-DL configuration #2 of Table 8, corresponding to reference TDD configuration value #2. For example, if downlink data is received from subframes #4, #5, #6, #7, and #8 of the LTE SCell 1003, the EN-DC UE transmits HARQ ACK/NACK feedback for the downlink data in subframe #2 of the PCell 1001 (indicated by reference numeral 1013), and if downlink data is received from subframes #9, #0, #1, #2, and #3 of the LTE SCell 1003, the EN-DC UE transmits HARQ ACK/NACK feedback for the downlink data in subframe #7 of the PCell 1001 (indicated by reference numeral 1014).

Referring to Table 8, which is similar to Table 3, if the UE receives from the base station a PDSCH transmitted to a subframe (n−k) of the FDD SCell, the UE transmits uplink HARQ ACK/NACK for the PDSCH to the uplink subframe n of the TDD PCell. At this time, "k" is an element of a set K, and K is as defined in Table 8. K is called a bundling window, and denotes a set of multiple downlink subframes in which PDCCH/EPDCCH or PDSCHs corresponding to transmission of HARQ ACK/NACK in one uplink subframe are transmitted.

TABLE 8

| DL-reference UL/DL Configuration | Subframe n | | | | | | | | | |
|---|---|---|---|---|---|---|---|---|---|---|
| | 0 | 1 | 2 | 3 | 4 | 5 | 6 | 7 | 8 | 9 |
| 0 | — | — | 6, 5 | 5, 4 | 4 | — | — | 6, 5 | 5, 4 | 4 |
| 1 | — | — | 7, 6 | 6, 5, 4 | — | — | — | 7, 6 | 6, 5, 4 | — |
| 2 | — | — | 8, 7, 6, 5, 4 | — | — | — | — | 8, 7, 6, 5, 4 | — | — |
| 3 | — | — | 11, 10, 9, 8, 7, 6 | 6, 5 | 5, 4 | — | — | — | — | — |
| 4 | — | — | 12, 11, 10, 9, 8, 7 | 7, 6, 5, 4 | — | — | — | — | — | — |
| 5 | — | — | 13, 12, 11, 10, 9, 8, 7, 6, 5, 4 | — | — | — | — | — | — | — |
| 6 | — | — | 8, 7 | 7, 6 | 6, 5 | — | — | 7 | 7, 6, 5 | — |

At this time, at the time of transmitting HARQ ACK/NACK feedback in subframe #2 of the PCell 1001, the EN-DC UE may transmit HARQ ACK/NACK feedback using PUCCH format 1a/1b, PUCCH 1b with channel selection, or PUCCH format 3/4/5, which are defined in the LTE standard. Which PUCCH format is to be used to, among the PUCCH formats, to transmit HARQ ACK/NACK feedback may be configured in advance for the EN-DC UE, through a higher-layer signal from a base station. Further, for a specific situation (for example, in the case of receiving a single PDSCH in a PCell 1001, scheduled by a PDCCH/EPDCCH in which a "DAI" field corresponds to 1, a single PDCCH indicating a DL SPS release in which a "DAI" field corresponds to 1, or a single PDSCH in the PCell 1001 in which the PDCCH/EPDCCH does not exist), the LTE standard may be arranged such that one of the PUCCH formats is to be used based on a determination by the UE. The higher-layer signal may include information on a PUCCH format that the EN-DC UE needs to use at the time of transmitting HARQ-ACK feedback and information on at least one resource or multiple resources for transmitting the PUCCH format, and the EN-DC UE may receive the higher-layer signal and thus transmit a PUCCH format including HARQ-ACK feedback via a specific resource.

The method for selecting, by the EN-DC UE, one resource from among resources for transmitting the PUCCH format is as follows. The EN-DC UE having received multiple PDCCHs/EPDCCHs through multiple subframes of the PCell 1001 or the LTE SCell 1003 may use the 2-bit value of "transmit power control (TPC) command" field of the PDCCH/EPDCCH to indicate one resource from among 4 resources if a "downlink assignment index (DAI)" field from the PDCCH/EPDCCH is greater than 1 or if the PDCCH/EPDCCH in which the "DAI" field is 1 is not the first PDCCH/EPDCCH in the set K (see Table 3 or Table 8). The UE having received one resource from the "TPC command" field transmits HARQ ACK/NACK feedback to the PUCCH format configured using the resource. At this time, if the "DAI" field is 1 or the PDCCH/EPDCCH in which the "DAI" field is 1 is the first PDCCH/EPDCCH in the set K (see Table 3 or Table 8), the 2-bit value of the "transmit power control (TPC) command" field of the PDCCH/EPDCCH may indicate a power adjustment value at the time of transmitting the configured PUCCH format. The EN-DC UE adjusts and transmits the power of the PUCCH format from the "TPC command" field.

Here, if the EN-DC UE receives only the PDSCH through one first PDCCH/EPDCCH in the PCell 1001 or only one PDCCH/EPDCCH for DL SPS release (indicated by reference numeral 1011 or 1012), or receives only one PDSCH in which the corresponding PDCCH is absent, or if the base station transmits PDCCH/EPDCCH for scheduling multiple PDSCHs in multiple subframes but the EN-DC UE receives only one PDSCH through one first PDCCH/EPDCCH due to a reception error, the "TPC command" field in the received PDCCH/EPDCCH is a field for power control at the time of transmitting a PUCCH format, and thus the EN-DC UE cannot know which resource among the plurality of configured PUCCH transmission resources should be used to transmit the PUCCH format. Accordingly, the disclosure provides a method for determining PUCCH transmission resources of a PUCCH format in the situation described above.

According to a first method, the base station may separately configure the PUCCH transmission resource of a PUCCH format for the EN-DC UE through a higher-layer signal in the situation described above. In addition to a plurality of resources (which are resources mapped to the TPC command field) for transmitting the PUCCH format described above, additional PUCCH resources may be configured to be used to address the issue described above. At this time, the PUCCH resource may be a resource for PUCCH format 3/4/5 or a resource for PUCCH format 1a/1b. Accordingly, if the UE determines that the PUCCH resource corresponds to a resource for PUCCH format 3/4/5 transmission or if the same is defined in a standard, the UE may transmit the PUCCH format 3/4/5 through the PUCCH resource. If the UE determines that the PUCCH resource corresponds to a resource for PUCCH format 1a/1b transmission or if the same is defined in the standard, the UE may transmit the PUCCH format 1a/1b through the PUCCH resource.

For example, different PUCCH resources may be configured with respect to the case where a single PDSCH in a PCell, scheduled by a PDCCH/EPDCCH in which a "DAI" field is 1, is received (case 1), the case where a single PDCCH indicating a DL SPS release in which a "DAI" field of 1 is received (case 2), and the case where a single PDSCH is received in a PCell in which the PDCCH/EPDCCH is absent (case 3), or a single PUCCH resource may be configured to be used for the above cases. In the above cases (that is, case 1, case 2, and case 3), if different PUCCH resources are configured and two or more cases occur within one bundling window (K), the UE may perform PUCCH format transmission using a PUCCH format 1b with channel selection. At this time, the PUCCH resource for transmission of the PUCCH format 1b with channel selection is configured by a resource configured for case 1, a resource configured for case 2, and a resource configured for case 3, and which resource is to be used is determined according to the transmitted HARQ-ACK information, and the UE may transmit PUCCH format 1b on the determined resource.

At this time, the characteristics of the resource for case 3 may be as follows. If only an LTE cell without an NR cell, i.e., without an SCG, is configured for the EN-DC UE, the EN-DC UE may receive, from a higher-layer signal, a preconfigured PUCCH resource for use in the case where a single PDSCH is received in a PCell from which a PDCCH/EPDCCH is absent, and may use the resource to perform PUCCH format transmission in case 3.

In the above cases (that is, case 1, case 2, and case 3), the UE may perform PUCCH format transmission using PUCCH format 3/4/5 if one PUCCH resource is configured to be a higher-layer signal and two or more cases occur within one bundling window (K).

The EN-DC UE receives the resource via a higher-layer signal, and transmits a PUCCH format including HARQ-ACK feedback through a resource configured via the higher-layer signal in the issue situation described above. Alternatively, the EN-DC UE may configure the PUCCH resource to be used for the issue situation within the plurality of resources (which are resources mapped to the TPC command field). For example, if there are four pre-configured resources (which are resources mapped to the TPC command field), one of the four resources may be configured, via a higher-layer signal, to be used in the issue described above, and the higher-layer signal may be included in information for configuring the plurality of resources and be transmitted as separate information. The UE transmits PUCCH format 3/4/5 via the PUCCH resource, and this transmission method enables the UE to transmit PUCCH format 3/4/5 without additional PUCCH resource configuration.

According to a second method, the base station may use the "TPC command" field in the first PDCCH/EPDCCH to indicate the PUCCH transmission resource of PUCCH format 3/4/5 to the EN-DC UE in the situation described above. Therefore, the "TPC command" field is used to adjust the power at the time of transmitting the PUCCH format, by the EN-DC UE, and is also used to determine resources for PUCCH format transmission. For example, the EN-DC UE transmits PUCCH format by adjusting power according to the value of the "TPC command" field in the resource indicated according to the value of the "TPC command" field in the first PDCCH/EPDCCH.

According to a third method, in the situation described above, the EN-DC UE transmits the PUCCH format by using, by default, one resource among a plurality of resources (which are resources mapped to the TPC command field) for transmitting the PUCCH format 3/4/5 described above. For example, among the plurality of resources, a resource to be used in the issue described above is defined in a standard, and the EN-DC UE transmits PUCCH format 3/4/5 including HARQ-ACK feedback via the predefined resource. For example, the standard may be arranged such that if the TPC command field is 2 bits, the first resource corresponding to "00" among "00", "01", "10", and "11" is to be used. Alternatively, the standard may be arranged such that which resource among four resources should be used is determined based on an equation including one or more pieces of information, such as a downlink subframe index in which a PDCCH/EPDCCH is received, an uplink subframe index in which a PUCCH is transmitted, and a UE unique identifier.

According to a fourth method, in the issue described above, the EN-DC UE includes the HARQ ACK/NACK feedback in the PUCCH format 1a/1b, instead of using PUCCH format 3/4/5, and transmits the same. At this time, a transmission resource of the PUCCH format 1a/1b may be implicitly mapped to the transmission resource of the PDCCH/EPDCCH, received in the issue described above. In order to prevent PUCCH transmission resource collision with an existing LTE UE, the base station may transmit an offset value to be added to the PUCCH transmission resource to the EN-DC UE through a higher-layer signal. The EN-DC UE may determine a transmission resource based on the implicitly mapped PUCCH transmission resource and the offset value. For example, the EN-DC UE having received the offset value determines the transmission resource of the PUCCH format 1a/1b by adding the offset value to the PUCCH transmission resource, which has been implicitly mapped to the received transmission resource of PDCCH/EPDCCH. Then, the EN-DC UE may transmit the PUCCH format 1a/1b via the determined transmission resource.

According to a fifth method, if the PUCCH resource is configured for the UE via a higher-layer signal, that is, if the UE receives the configuration of the PUCCH resource via a higher-layer signal in addition to a resource mapped to a TPC command field, in order to address the issue described above, the UE may transmit a PUCCH format on the configured PUCCH transmission resource via the higher-layer signal. Therefore, as described according to the first method, the UE receives the higher-layer signal from a base station and transmits the corresponding PUCCH format on the PUCCH resource according thereto. If, as described according to the first method, the PUCCH resource for addressing the issue described above is not separately configured for the UE, whether to transmit the PUCCH format using a certain resource among the preconfigured PUCCH resources, that is, among resources mapped to the TPC command field, is defined in the standard as described according to the third method, and the UE may determine the PUCCH resource by the defined method and transmit the PUCCH format. Therefore, in this case, as described according to the third method, the UE transmits a corresponding PUCCH format using the PUCCH resource defined in the standard if there is no higher-layer signal from the base station or if corresponding information is absent in the higher-layer signal.

According to the fifth method described above, if the base station determines that PDCCH reception by the UE is not stable, it is possible to perform PUCCH transmission on the resource by additionally configuring the PUCCH transmission resource through the higher-layer signal. If it is determined that the PDCCH reception by the UE is stable, it is possible to use the resource to perform data transmission without additionally configuring the PUCCH transmission resource through the higher-layer signal.

Figure 11:
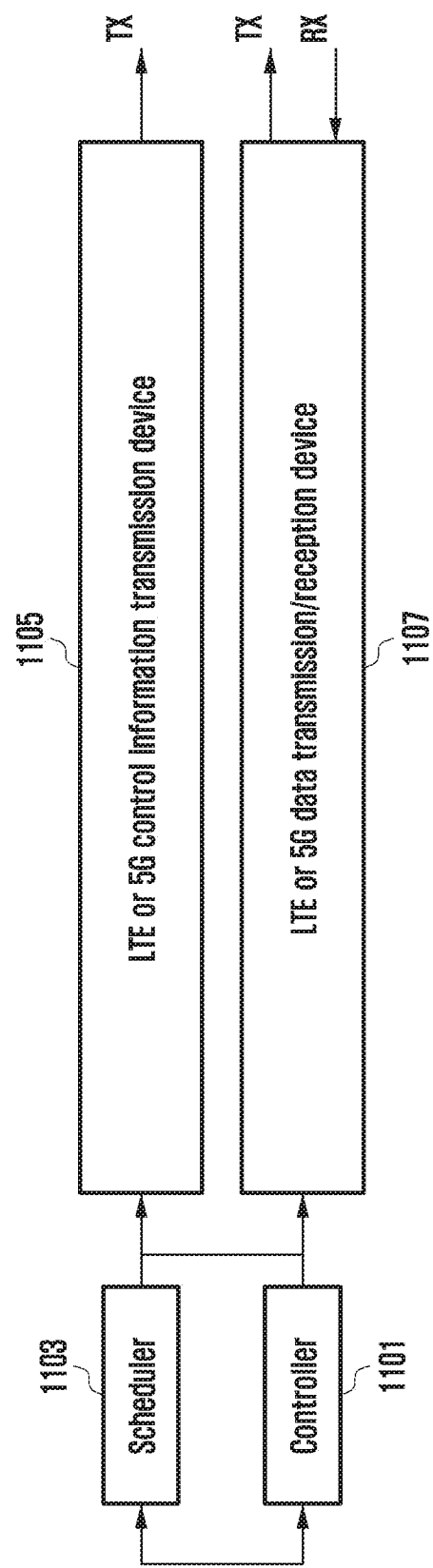
FIG. 11 illustrates a base station according to an embodiment of the disclosure.

FIG. 11 illustrates a base station according to an embodiment of the disclosure.

Referring to FIG. 11, a controller 1101 may configure required information according to the base station procedure according to FIG. 9A of the disclosure and various embodiments of the disclosure, and may control uplink transmission timing and uplink transmission reception from a UE according to various embodiments. The controller 1101 may perform control so as to transmit control information through an LTE or 5G control information transmission device 1105, and may transmit or receive data to or from a UE through an LTE or 5G data transmission/reception device 1107. In addition, the controller 1101 may perform control such that a scheduler 1103 schedules LTE or 5G data and transmits or receives LTE or 5G data to or from the UE through the LTE or 5G data transmission/reception device 1107. In the above, the base station device includes the controller 1101, the scheduler 1103, the LTE or 5G control information transmission device 1105, and the LTE or 5G data transmission/reception device 1107, but the base station device may include a transceiver and a controller. The controller may control the operation of the base station according to various embodiments. Although LTE and 5G have been described together for convenience in the base station, the base station may be an NR base station using NR radio access or an E-UTRA base station using E-UTRA radio access.

According to an embodiment of the disclosure the controller is configured to transmit, to a terminal via the transceiver, a higher signal including a plurality of PUCCH resource information, to transmit, to the terminal via the transceiver, a PDSCH, and to receive, from the terminal via the transceiver, a HARQ feedback information corresponding to the PDSCH based on a PUCCH format and resource, wherein the PUCCH format uses a preset format and the resource corresponds to a first PUCCH resource among the plurality of PUCCH resource information, in case that Evolved UMTS EUTRA NR—EN-DC is set in the terminal, TDD frame structure is set in a primary cell (PCell) of the terminal, a reference TDD configuration information is set in the terminal, and a DAI field value of a DCI format corresponding to the PDSCH is set in 1.

According to an embodiment of the disclosure wherein the preset format is a PUCCH format 3. According to an embodiment of the disclosure wherein the PUCCH format uses the preset format and the resource corresponds to the first PUCCH resource among the plurality of PUCCH resource information, in case that the EN-DC is set in the terminal, TDD frame structure is set in the PCell of the terminal, the reference TDD configuration information is set in the terminal, and a PDCCH corresponding to the PDSCH is not detected.

According to an embodiment of the disclosure wherein the reference TDD configuration information indicates a reference configuration for transmitting an LTE uplink signal, and wherein the reference TDD configuration information indicates at least one of the TDD configuration 2, 4, or 5.

According to an embodiment of the disclosure wherein the controller is further configured to transmit a PDCCH indicating a release of a downlink (DL) SPS and to receive new HARQ feedback information corresponding to a reception of the PDCCH, wherein the new HARQ feedback information is transmitted based on the preset format and the first PUCCH resource among the plurality of PUCCH resource information, in case that EN-DC is set in the terminal, TDD frame structure is set in the PCell of the terminal, the reference TDD configuration information is set in the terminal, and the DAI field value of the PDCCH is set in 1.

Figure 12:
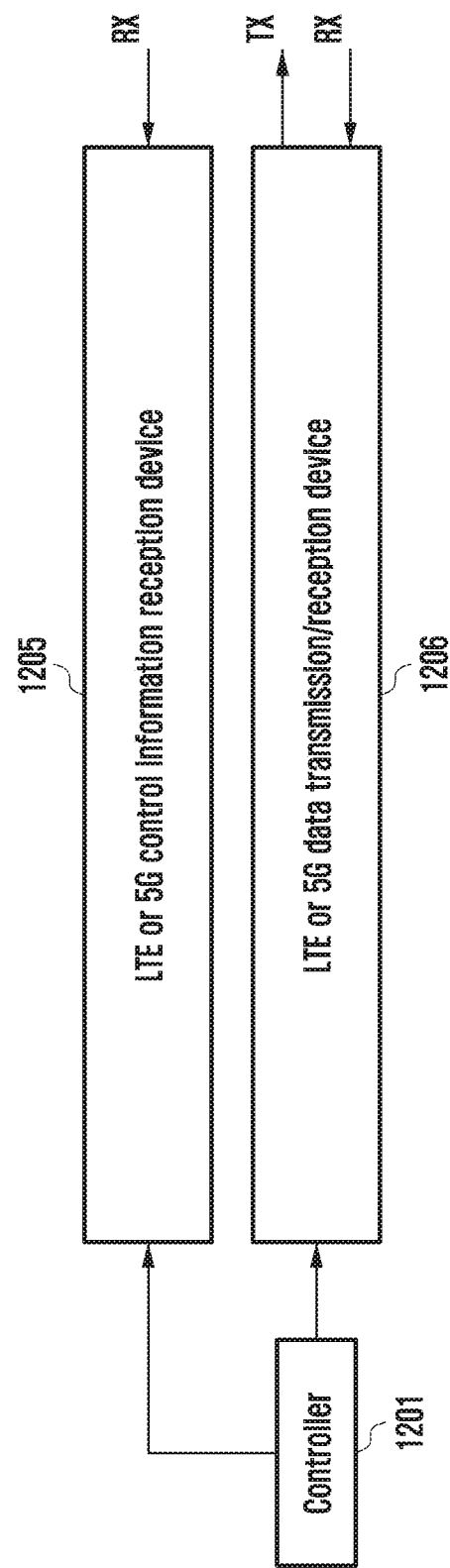
FIG. 12 illustrates a UE according to an embodiment of the disclosure.

FIG. 12 illustrates a UE according to an embodiment of the disclosure.

Referring to FIG. 12, a controller 1201 may receive, from a base station, required configuration information and scheduling according to the UE procedure of FIG. 9B of the disclosure and various embodiments of the disclosure, and may control uplink transmission timing and uplink transmission power according to the disclosure so as to perform uplink transmission configured by the base station or indicated by scheduling. The UE may receive the location of an uplink data channel transmission resource from the base station through an LTE or 5G control information reception device 1205 and an LTE or 5G data transmission/reception device 1206 or multiplex uplink control information on an uplink data channel and transmit the same. The controller 1201 may perform control such that LTE or 5G data, scheduled at the received resource location, is transmitted or received to or from the LTE or a 5G base station through the LTE or 5G data transmission/reception device 1206. In the above, the UE includes the controller 1201, the LTE or 5G control information reception device 1205, and the LTE or 5G data transmission/reception device 1206, but the UE may include a transceiver and a controller. The controller may control the operation of the UE according to various embodiments. Referring to FIG. 12, LTE and 5G have been described together for convenience of explanation. The base station for transmitting or receiving the control information and data may be an NR base station using NR radio access or an E-UTRA base station using E-UTRA radio access.

According to an embodiment of the disclosure wherein the controller is configured to receive, via the transceiver, a higher signal including a plurality of PUCCH resource information, to determine a PUCCH format and resource for a HARQ feedback information corresponding to a PDSCH, and to transmit, via the transceiver, the HARQ feedback information based on the determined PUCCH format and the resource, wherein the PUCCH format uses a preset format and the resource corresponds to a first PUCCH resource among the plurality of PUCCH resource information, in case that EUTRA NR—EN-DC is set in the terminal, TDD frame structure is set in a primary cell (PCell) of the terminal, a reference TDD configuration information is set in the terminal, and a DAI field value of a DCI format corresponding to the PDSCH is set in 1.

According to an embodiment of the disclosure wherein the preset format is a PUCCH format 3. According to an embodiment of the disclosure wherein the PUCCH format uses the preset format and the resource corresponds to the first PUCCH resource among the plurality of PUCCH resource information, in case that the EN-DC is set in the terminal, TDD frame structure is set in the PCell of the terminal, the reference TDD configuration information is set in the terminal, and a physical downlink control channel (PDCCH) corresponding to the PDSCH is not detected.

According to an embodiment of the disclosure wherein the reference TDD configuration information indicates a reference configuration for transmitting a LTE uplink signal, and wherein the reference TDD configuration information indicates at least one of the TDD configuration 2, 4, or 5.

According to an embodiment of the disclosure wherein the controller is further configured to receive a PDCCH indicating a release of a DL SPS, and to transmit new HARQ feedback information corresponding to a reception of the PDCCH, wherein the new HARQ feedback information is transmitted based on the preset format and the first PUCCH resource among the plurality of PUCCH resource information, in case that EN-DC is set in the terminal, TDD frame structure is set in the PCell of the terminal, the reference TDD configuration information is set in the terminal, and the DAI field value of the PDCCH is set in 1.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A method performed by a terminal in a wireless communication system, the method comprising:
receiving a higher signal including a plurality of physical uplink control channel (PUCCH) resource information;
determining a PUCCH format and a resource for a hybrid automatic repeat request (HARQ) feedback information corresponding to a physical downlink shared channel (PDSCH); and
transmitting the HARQ feedback information based on the determined PUCCH format and the resource, wherein the PUCCH format uses a preset format and the resource corresponds to a first PUCCH resource among the plurality of PUCCH resource information, in case that Evolved universal mobile telecommunications system (UMTS) Terrestrial Radio Access (EUTRA) new radio (NR)—dual connectivity (EN-DC) is set in the terminal, time division duplex (TDD) frame structure is set in a primary cell (PCell) of the terminal, a reference TDD configuration information is set in the terminal, and a downlink assignment index (DAI) field value of a downlink control information (DCI) format corresponding to the PDSCH is set in 1.

2. The method of claim 1, wherein the preset format is a PUCCH format 3.

3. The method of claim 1,
wherein the PUCCH format uses the preset format and the resource corresponds to the first PUCCH resource among the plurality of PUCCH resource information, in case that the EN-DC is set in the terminal, TDD frame structure is set in the PCell of the terminal, the reference TDD configuration information is set in the terminal, and a physical downlink control channel (PDCCH) corresponding to the PDSCH is not detected.

4. The method of claim 1,
wherein the reference TDD configuration information indicates a reference configuration for transmitting a long term evolution (LTE) uplink signal, and
wherein the reference TDD configuration information indicates at least one of the TDD configuration 2, 4, or 5.

5. The method of claim 1, further comprising:
receiving a PDCCH indicating a release of a downlink (DL) semi persistent scheduling (SPS); and
transmitting new HARQ feedback information corresponding to a reception of the PDCCH,
wherein the new HARQ feedback information is transmitted based on the preset format and the first PUCCH resource among the plurality of PUCCH resource information, in case that EN-DC is set in the terminal, TDD frame structure is set in the PCell of the terminal, the reference TDD configuration information is set in the terminal, and the DAI field value of the PDCCH is set in 1.

6. A method performed by a base station in a wireless communication system, the method comprising:
transmitting, to a terminal, a higher signal including a plurality of physical uplink control channel (PUCCH) resource information;
transmitting, to the terminal, a physical downlink shared channel (PDSCH); and
receiving, from the terminal, a hybrid automatic repeat request (HARQ) feedback information corresponding to the PDSCH based on a PUCCH format and a resource, wherein the PUCCH format uses a preset format and the resource corresponds to a first PUCCH resource among the plurality of PUCCH resource information, in case that Evolved universal mobile telecommunications system (UMTS) Terrestrial Radio Access (EUTRA) new radio (NR)—dual connectivity (EN-DC) is set in the terminal, time division duplex (TDD) frame structure is set in a primary cell (PCell) of the terminal, a reference TDD configuration information is set in the terminal, and a downlink assignment index (DAI) field value of a downlink control information (DCI) format corresponding to the PDSCH is set in 1.

7. The method of claim 6, wherein the preset format is a PUCCH format 3.

8. The method of claim 6,
wherein the PUCCH format uses the preset format and the resource corresponds to the first PUCCH resource among the plurality of PUCCH resource information, in case that the EN-DC is set in the terminal, TDD frame structure is set in the PCell of the terminal, the reference TDD configuration information is set in the terminal, and a physical downlink control channel (PDCCH) corresponding to the PDSCH is not detected.

9. The method of claim 6,
wherein the reference TDD configuration information indicates a reference configuration for transmitting a long term evolution (LTE) uplink signal, and
wherein the reference TDD configuration information indicates at least one of the TDD configuration 2, 4, or 5.

10. The method of claim 6, further comprising:
transmitting a PDCCH indicating a release of a downlink (DL) semi persistent scheduling (SPS); and
receiving new HARQ feedback information corresponding to a reception of the PDCCH,
wherein the new HARQ feedback information is transmitted based on the preset format and the first PUCCH resource among the plurality of PUCCH resource information, in case that EN-DC is set in the terminal, TDD frame structure is set in the PCell of the terminal, the reference TDD configuration information is set in the terminal, and the DAI field value of the PDCCH is set in 1.

11. A terminal in a wireless communication system, the terminal comprising:
a transceiver; and
a controller configured to:
receive, via the transceiver, a higher signal including a plurality of physical uplink control channel (PUCCH) resource information,
determine a PUCCH format and a resource for a hybrid automatic repeat request (HARQ) feedback information corresponding to a physical downlink shared channel (PDSCH), and
transmit, via the transceiver, the HARQ feedback information based on the determined PUCCH format and the resource, wherein the PUCCH format uses a preset format and the resource corresponds to a first PUCCH resource among the plurality of PUCCH resource information, in case that Evolved universal mobile telecommunications system (UMTS) Terrestrial Radio Access (EUTRA) new radio (NR)—dual connectivity (EN-DC) is set in the terminal, time division duplex (TDD) frame structure is set in a primary cell (PCell) of the terminal, a reference TDD configuration information is set in the terminal, and a downlink assignment index (DAI) field value of a downlink control information (DCI) format corresponding to the PDSCH is set in 1.

37

12. The terminal of claim 11, wherein the preset format is a PUCCH format 3.

13. The terminal of claim 11,
wherein the PUCCH format uses the preset format and the resource corresponds to the first PUCCH resource among the plurality of PUCCH resource information, in case that the EN-DC is set in the terminal, TDD frame structure is set in the PCell of the terminal, the reference TDD configuration information is set in the terminal, and a physical downlink control channel (PDCCH) corresponding to the PDSCH is not detected.

14. The terminal of claim 11,
wherein the reference TDD configuration information indicates a reference configuration for transmitting a long term evolution (LTE) uplink signal, and
wherein the reference TDD configuration information indicates at least one of the TDD configuration 2, 4, or 5.

15. The terminal of claim 11,
wherein the controller is further configured to:
receive a PDCCH indicating a release of a downlink (DL) semi persistent scheduling (SPS), and
transmit new HARQ feedback information corresponding to a reception of the PDCCH,
wherein the new HARQ feedback information is transmitted based on the preset format and the first PUCCH resource among the plurality of PUCCH resource information, in case that EN-DC is set in the terminal, TDD frame structure is set in the PCell of the terminal, the reference TDD configuration information is set in the terminal, and the DAI field value of the PDCCH is set in 1.

16. A base station in a wireless communication system, the base station comprising:
a transceiver; and
a controller configured to:
transmit, to a terminal via the transceiver, a higher signal including a plurality of physical uplink control channel (PUCCH) resource information,
transmit, to the terminal via the transceiver, a physical downlink shared channel (PDSCH), and
receive, from the terminal via the transceiver, a hybrid automatic repeat request (HARQ) feedback information corresponding to the PDSCH based on a PUCCH format and a resource, wherein the PUCCH format uses a preset format and the resource corresponds to a first PUCCH resource among the plurality of PUCCH resource information, in case that Evolved universal mobile telecommunications system (UMTS) Terrestrial Radio Access (EUTRA) new radio (NR)—dual connectivity (EN-DC) is set in the terminal, time division duplex (TDD) frame structure is set in a primary cell (PCell) of the terminal, a reference TDD configuration information is set in the terminal, and a downlink assignment index (DAI) field value of a downlink control information (DCI) format corresponding to the PDSCH is set in 1.

17. The base station of claim 16, wherein the preset format is a PUCCH format 3.

18. The base station of claim 16,
wherein the PUCCH format uses the preset format and the resource corresponds to the first PUCCH resource among the plurality of PUCCH resource information, in case that the EN-DC is set in the terminal, TDD frame structure is set in the PCell of the terminal, the reference TDD configuration information is set in the terminal, and a physical downlink control channel (PDCCH) corresponding to the PDSCH is not detected.

19. The base station of claim 16,
wherein the reference TDD configuration information indicates a reference configuration for transmitting a long term evolution (LTE) uplink signal, and
wherein the reference TDD configuration information indicates at least one of the TDD configuration 2, 4, or 5.

20. The base station of claim 16,
wherein the controller is further configured to:
transmit a PDCCH indicating a release of a downlink (DL) semi persistent scheduling (SPS), and
receive new HARQ feedback information corresponding to a reception of the PDCCH, and
wherein the new HARQ feedback information is transmitted based on the preset format and the first PUCCH resource among the plurality of PUCCH resource information, in case that EN-DC is set in the terminal, TDD frame structure is set in the PCell of the terminal, the reference TDD configuration information is set in the terminal, and the DAI field value of the PDCCH is set in 1.

* * * * *